Sept. 3, 1957 W. E. WALKER ET AL 2,805,280

TELEGRAPH SYSTEM

Filed June 21, 1955 8 Sheets-Sheet 1

INVENTORS
WILLIAM E. WALKER
& JAMES S. HARRIS
BY Charles H. Brown
ATTORNEY

TELEGRAPH SYSTEM

Filed June 21, 1955 8 Sheets-Sheet 2

INVENTORS
WILLIAM E. WALKER
& JAMES S. HARRIS
BY Charles H. Brown
ATTORNEY

INVENTORS
WILLIAM E. WALKER
& JAMES S. HARRIS
BY Charles H. Brown
ATTORNEY

INVENTORS
WILLIAM E. WALKER
& JAMES S. HARRIS
BY Charles H. Brown
ATTORNEY

INVENTORS
WILLIAM E. WALKER
& JAMES S. HARRIS
BY Charles H. Brown
ATTORNEY

INVENTORS
WILLIAM F. WALKER
& JAMES S. HARRIS
BY Charles H. Brown
ATTORNEY

INVENTORS
WILLIAM E. WALKER
& JAMES S. HARRIS
BY Charles H. Brown
ATTORNEY

TELEGRAPH SYSTEM

INVENTORS
WILLIAM E. WALKER
& JAMES S. HARRIS
BY Charles H Brown
ATTORNEY 2,805,280

TELEGRAPH SYSTEM

William E. Walker, Brooklyn, N. Y., and James S. Harris, Old Greenwich, Conn., assignors to Radio Corporation of America, a corporation of Delaware Application June 21, 1955, Serial No. 516,882

25 Claims. (Cl. 178—2)

This invention relates to telegraph communication systems. Particularly, the invention is a telegraph communication system designed to selectively transmit messages from a transmitting terminal station to a receiving terminal station either in multiplex fashion, in simplex fashion or in both simplex and multiplex forms of transmission.

A telegraph communication system includes a transmitting terminal station and a receiving terminal station electrically interconnected by suitable transmission lines. The transmitting station generally includes a number of telegraph transmitters, each of which is operated to transmit messages over the transmission lines to receiving equipment at the receiving station.

Various arrangements have been devised for controlling the feeding of messages from the output circuits of the transmitters to the receiving equipment at the receiving station. In one type of arrangement known as a multiplex system, the messages from the transmitters are sequentially transmitted over a single transmission line. This type of arrangement in which the time of the transmission line is sequentially allotted to the different transmitters is known as time division multiplex transmission. Means are provided at the receiving station for distributing the messages included in the received multiplex signal among a plurality of receiving devices. The receiving devices may be located at a Central Office or may be individually located at subscriber stations remote from the Central Office which services them. In either case, each of the receiving devices represents an individual receiving station to which messages may be sent by the transmitters at the transmitting station. The distribution of the messages at the receiving terminal station may be controlled synchronously with the operation of multiplexing equipment at the transmitting station or may be controlled by information forwarded over the single transmission line by the transmitting terminal station, as, for example, routing information preceding each message transmitted over the line. In another and simpler type of arrangement known as simplex, the output circuit of each transmitter is operatively connected directly to a particular one of the receiving devices at a receiving station by an individual transmission line. The full capacity of each of the lines interconnecting the transmitting station and receiving station is occupied by the messages transmitted by a single one of the transmitters.

Both types of arrangement have advantages when used in particular applications. Under normal operating conditions, service can be supplied to subscribers by utilizing the multiplex type of transmission. Further, a separate transmission line may not be available for use by each of the transmitters in which case the use of the multiplex type of transmission is desirable and necessary. By the use of high speed transmission, a number of messages can be transmitted over a single transmission line and distributed to receiving devices by the distributing equipment at the receiving station in a short period of time. The time of the transmission line is sequentially allotted to each transmitter, permitting each of the transmitters to transmit messages to a particular receiving device operated through the distributing equipment at the receiving terminal station. However, during certain periods of operation, the volume of traffic destined for a particular receiving device from one of the transmitters may greatly exceed that destined for the remaining receiving devices from the other transmitters. If the single transmission line is operating at or near full capacity, it will not be possible to speed up the rate of transmission to accommodate the increased volume of traffic destined for the particular receiving device. During such periods, the use of an individual transmission line between the transmitter and the receiving device is more desirable. Assuming that additional transmission lines are available, by connecting the output circuit of the transmitter handling the increased volume of traffic directly to a particular receiving device at the receiving station through an individual transmission line, the full capacity of the line may be occupied by the traffic forwarded by that transmitter. Inasmuch as the transmitter is now operating over the full capacity of a transmission line rather than a portion of the capacity, as would be the case in multiplex transmission, the rate of transmission will be greatly increased and the increased volume of traffic may be handled satisfactorily.

A telegraph system in accordance with the invention includes means for controlling the transmission of the messages transmitted by each of the transmitters at the transmitting terminal station over a single transmission line, if multiplex transmission is adequate to handle the volume of traffic, and, particularly, when only one transmission line is available. The system of the invention also includes means for controlling the transmission of messages when the volume of traffic destined for a particular one of the receiving devices or each of the receiving devices at the receiving terminal station increases to such an extent that the traffic cannot satisfactorily be handled by the use of multiplex transmission. Assuming that a sufficient number of transmission lines are available, a separate transmission line is assigned to handle the messages destined for the particular one or each of the receiving devices. The system should, therefore, include means for utilizing multiplex transmission, multiplex and simplex transmission or simplex transmission only, the particular type of transmission used being determined by the volume of traffic, availability of transmission lines and other circumstances existent during the operation of the system.

It is an object of this invention to provide an improved telegraph communication system which may be operated to transmit messages between a transmitting and receiving station operating either as a multiplex transmission system, a simplex transmission system or as a transmission system including both multiplex and simplex forms of transmission.

It is a further object of this invention to provide an improved telegraph transmitting station capable of transmitting messages from a plurality of transmitting devices over a plurality of transmission lines in one or more selectable ways at the option of the operator.

It is a still further object of this invention to provide a novel type of telegraph transmitting station capable of transmitting messages from a plurality of transmitting devices over transmission lines in either multiplex, simplex or both multiplex and simplex fashion.

The invention in effect comprises a combination of three different types of telegraph communication systems, namely, a multiplex transmission system, a simplex transmission system and a transmission system including both a multiplex and simplex transmission system. Means are provided at the transmitting terminal station under the control of an operator for enabling a selection of either type of transmission system.

A transmitting terminal station and a receiving terminal station are interconnected by a plurality of transmission lines. The transmitting terminal station includes a number of telegraph message transmitters. A telegraph transmitter set to transmit routing information is associated with each of the message transmitters.

In the first type of transmission, the message and routing transmitters are operated to transmit messages sequentially over a single transmission line. A common transmission line is sequentially assigned to the different message transmitters for the transmission of messages thereover. The messages transmitted by each of the message transmitters are preceded by the routing information transmitted by one of the routing transmitters, a routing transmitter being operatively associated with each of the message transmitters. The routing information precedes a message and indicates the particular receiving device which is to receive the message. The transmitters are sequentially operated to transmit messages over the line on a message by message basis.

In another type of transmission, the control equipment at the transmitting terminal station enables a single one of the plurality of message transmitters to transmit messages over an individual transmission line, and the remaining message transmitters and the routing transmitters associated therewith to sequentially operate to transmit messages in multiplex fashion over a second transmission line.

If the necessary transmission lines are available, the control equipment at the transmitting station may also be made to operate the message transmitters so that each message transmitter transmits messages over an individual transmission line, in which case a separate transmission line is assigned to each message transmitter. In this instance the full capacity of each of the lines is occupied by the messages transmitted by the particular one of the message transmitters connected thereto.

The receiving terminal station is constructed to properly handle the messages transmitted over the transmission lines in anyone of the types of transmission possible. The receiving station includes a receiving director unit to which are connected the transmission lines extending from the output circuits of the transmitters at the transmitting terminal station. A plurality of receiving devices, such as telegraph printers or reperforators, are operatively connected to the output circuits of the director unit. Included in the receiving director unit is a switching circuit and a selector control. The selector control includes a number of operating positions. By setting the selector control at one of the positions, the switching circuit of the receiving director unit is controlled to operate in a predetermined sequence to provide the proper termination for the transmission lines in the receiving station. The selector control controls the operation of the receiving director unit to distribute the messages received over the transmission lines to the receiving devices when anyone of the types of transmission available is utilized. It will be remembered that, in one type of transmission, the message and routing transmitters may be sequentially operated to transmit messages over a single transmission line. Each message transmitted by the message transmitters is then preceded by routing information. The selector control of the receiving director unit is set at the position corresponding to this type of transmission. The switching circuit of the director unit operates in a predetermined sequence to separate the messages as they are received over the line and to feed them to the receiving devices in accordance with the routing information preceding each message.

In another type of transmission, an individual transmission line is assigned full time to one of the message transmitters. The remaining message transmitters and the routing transmitters associated therewith are sequentially operated to transmit messages over a second transmission line. The selector control of the receiving director unit is then set at a position corresponding to this type of transmission and the switching circuit of the receiving director unit operates in a predetermined sequence to connect one of the receiving devices at the receiving station directly to the transmission line which is assigned full time to the single message transmitter. The switching circuit also operates to separate the messages transmitted over the second transmission line by the remaining message transmitters and the routing transmitters associated therewith, and to feed the messages to the intended receiving devices at the receiving station in accordance with the routing information preceding each message. A proper termination is provided for the messages transmitted over both of the transmission lines.

In the remaining type of transmission, each of the message transmitters may be operated to transmit messages over individual transmission lines assigned thereto. The selector control of the receiving director unit is then set at still another position corresponding to this type of transmission. The switching circuit of the receiving director unit is operated in a predetermined sequence to connect a single one of the receiving devices at the receiving station directly to each of the transmission lines. Each of the message transmitters is operatively connected by one of the transmission lines directly to an individual receiving device at the receiving station. The full capacity of each of the transmission lines will be occupied by the messages transmitted by the particular transmitter connected thereto and the transmitters may be operated continuously and simultaneously over the respective lines.

A more detailed description of the invention follows with reference to the accompanying drawing in which:

Fig. 1 is a block diagram of a telegraph communication system constructed according to the invention;

Figs. 2*a*, 2*b*, 2*c* and 2*d* disclose a circuit diagram of one embodiment of a transmitting terminal station suitable for use in the system shown in Fig. 1;

Fig. 3 is a block diagram depicting the manner in which Figs. 2*a*, 2*b*, 2*c* and 2*d* are to be assembled;

Figs. 4*a* and 4*b* disclose a circuit diagram of one embodiment of a receiving terminal station suitable for use in the system shown in Fig. 1;

Fig. 5 is a block diagram depicting the manner in which Figs. 4*a* and 4*b* are to be assembled;

Figures 1, 3:
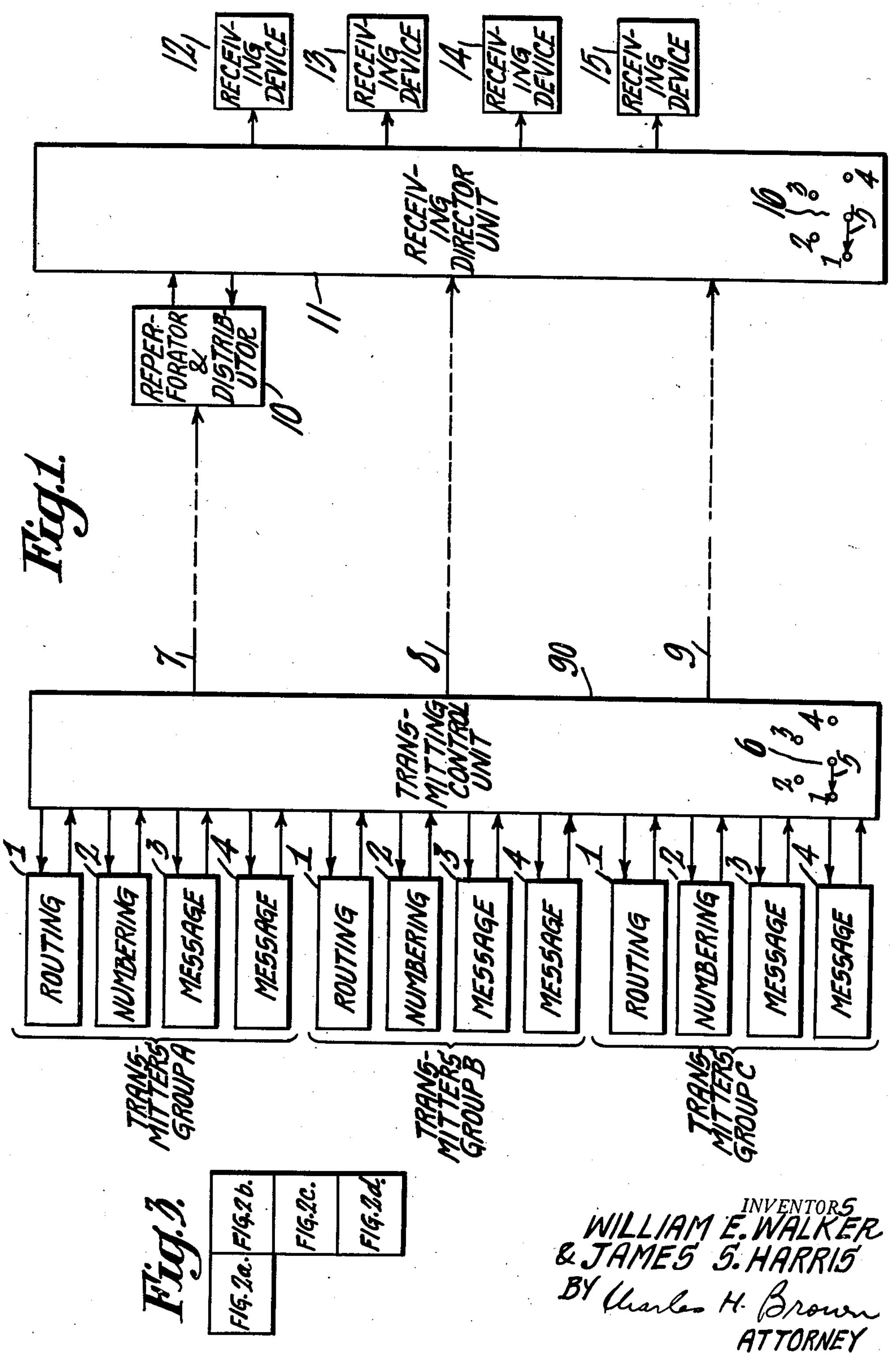

Referring to Fig. 1, there is shown a block diagram of a telegraph communication system constructed according to the invention. Three groups of transmitters are shown, namely, groups A, B and C. The terms group of transmitters and transmitter group, as used in the specification, are to be considered as referring to a telegraph transmitting device. The transmitting devices may all be located at a central office or may be individually located at subscribers' stations remote from the central office which services them. In the embodiment of the invention to be described, each of the transmitting devices includes four separate telegraph transmitters. The first transmitter 1 is operated to transmit routing information. The second transmitter 2 is a numbering transmitter and transmits one of a sequential group of numbers preceding each message transmitted by the group, identifying the message for purposes of record keeping and so on. The third transmitter 3 is a message transmitter and the fourth transmitter 4 is also a message transmitter. The sequence of operation of the transmitters in each transmitter group follows the order given above. The routing transmitter 1 will be operated first, followed by the numbering transmitter 2 and, thereafter, one of the message transmitters 3 or 4. Each of the transmitter groups will be operated in the same sequence. The four transmitters of each group A, B and C, twelve transmitters in all, will be operatively connected to a transmitting control unit 90. Included in the control unit 90 is a selector control 6, including a wiper 5 and four operating positions. Three transmission lines 7, 8 and 9 are connected to the output circuits of the transmitting control unit 90, the transmission lines each including a radio frequency, long line or other suitable transmission system known in the art.

When the wiper 5 of the selector control 6 is set at position 1, the messages transmitted by each of the three groups of transmitters A, B and C will be sequentially transmitted over line 7 to a reperforator-distributor 10 at a receiving station on a message by message basis. Each message transmitted by each group will include routing and numbering information transmitted by transmitters 1 and 2 and a message transmitted by message transmitter 3 or message transmitter 4. Only one of the transmitter groups will be operated at a time. Position 1 of selector control 6, therefore, controls the transmitting control unit 90 to bring about the multiplex operation of the system.

When wiper 5 is set at position 2 of the selector control 6, the transmitting control unit 90 will be operated to connect the output circuits of the transmitters 1 through 4 of group A to line 8. The transmitters 1 through 4 of group B and the transmitters 1 through 4 of group C will again be sequentially connected to line 7. At position 3, the transmitting control unit 90 will be operated to connect the output circuits of the transmitters 1 through 4 of group B to line 8. The transmitters 1 through 4 of group A and the transmitters 1 through 4 of group C will be connected to line 7. At positions 2 and 3 of selector control 6, therefore, both multiplex and simplex transmission will be used. In both cases, the time of line 7 will be occupied by messages transmitted by at least two of the groups of transmitters. The transmitting control unit 90 will act as multiplexing equipment to sequentially feed the messages from the two groups of transmitters over the line 7. In both cases, line 8 will be occupied by messages transmitted by only one of the transmitter groups. The line 8 will be connected to the output circuits of the transmitters of the group through the transmitting control unit 90 and simplex transmission over line 8 will result.

When the wiper 5 of the selector control 6 is set on position 4, the transmitting control unit 90 will be operated to connect the output circuits of transmitters 1 through 4 of group A to line 8. The output circuits of transmitters 1 through 4 of group B will be connected to line 9 and the output circuits of transmitters 1 through 4 of group C will be connected to line 7. The full capacity of each of the transmission lines, lines 7, 8 and 9, will be occupied by the messages transmitted by the particular transmitter group A, B or C connected thereto.

Line 7 is connected to a reperforator-distributor 10 at a receiving terminal station, the output of the reperforator-distributor 10 being fed to a receiving director unit 11. Lines 8 and 9 terminate at the receiving director unit 11. Four receiving devices 12, 13, 14 and 15 are operatively connected to the output circuits of the receiving director unit 11. The receiving devices may be printers, reperforators or other types of telegraph recording equipment. A selector control 16, including a wiper 5 and four operating positions, is included in the receiving director unit 11, the sequence of operation of the unit 11 being determined by the setting of the selector control. The positions of the control 16 correspond to the positions of the selector control 6 in the transmissing control unit 90. When the control 6 is set on position 1, the messages transmitted by the three groups of transmitters A, B and C will be sequentially fed over line 7. Control 16 of the receiving director unit 11 will also be set on position 1. The operation of the receiving director unit 11 will be controlled to distribute the messages received by the reperforator-distributor 10 through the receiving director unit 11 among the receiving devices 12, 13, 14 and 15 in accordance with the routing information preceding each message, indicating the particular receiving device to which the following message is sent. For example, all the messages transmitted by the transmitters of group A will be fed to receiving device 12, messages transmitted by the transmitters of group B will be fed to receiving device 13 and the messages transmitted by the transmitters of group C will be fed to receiving device 14.

If the wiper 5 of selector control 6 of the transmitting control unit 90 is set on position 2, the transmitting control unit will be operated to connect the output circuits of the transmitters of group A to line 8, the output circuits of the transmitters of groups B and C being sequentially connected to line 7. The wiper 5 of selector control 16 of receiving director unit 11 will also be set on position 2. The director unit 11 will be operated to feed the messages transmitted over line 7 by the transmitters of group B to receiving device 13 and the messages transmitted over line 7 by the transmitters of group C to receiving device 14 in much the same manner as it did when the wiper 5 of the control 16 was set on position 1. The operation of the receiving director unit 11 will connect the receiving device 12 directly to the line 8 through the director unit. The output circuits of the transmitters of group A will be operatively connected to the receiving device 12. The full capacity of line 8 will be occupied by the messages transmitted by the transmitters of group A and the transmitter group may be operated at the maximum rate of transmission possible.

When the wiper 5 of selector control 6 of the transmitting control unit 90 is set on position 3, the transmitting control unit 90 will be operated to connect the output circuits of the transmitters of group B to line 8, the output circuits of the transmitters of groups A and C being sequentially connected to line 7. The wiper 5 of selector control 16 of receiving director unit 11 will also be set on position 3. Messages transmitted over line 7 by the transmitters of group A will be fed by the operation of the receiving director unit 11 to receiving device 12 and the messages transmitted over line 7 by the transmitters of group C will be fed to receiving device 14. Receiving device 13 will be connected by the operation of the receiving director unit 11 through the unit to line 8. The output circuits of the transmitters of group B will be operatively connected to receiving device 13 over line 8. The full capacity of the line 8 will be occupied by the messages transmitted by the transmitters of group B and the transmitter group may be operated at the maximum rate of transmission possible.

The operation of the system may require that each transmitting group be connected directly to a receiving device over an individual transmission line. In such a case, all three transmitting groups will be operated at the maximum rate of transmission possible, the full capacity of each of the lines being occupied by the messages transmitted by the particular transmitting group connected thereto. The wiper 5 of selector control 6 of transmitting control unit 90 will be set on position 4. The transmitting control unit 90 will be operated to connect the output circuits of the transmitters of group A to line 8, the output circuits of the transmitters of group B to line 9 and the output circuits of the transmitters of group C to line 7. The wiper 5 of the selector control 16 of the receiving director unit 11 is also set on position 4. The receiving director unit 11 will be operated to connect receiving device 12 to line 8, receiving device 13 to line 9 and receiving device 14 to line 7. The output circuits of each of the groups of transmitters will be operatively connected to a single one of the receiving devices. The full capacity of each of the lines will be occupied by the messages transmitted by the particular transmitting group connected thereto and each of the groups of transmitters can be simultaneously operated at the maximum rate of transmission possible.

When the transmitter groups are being controlled in multiplex operation, the routing information, as received by the reperforator-distributor 10, preceding certain of the messages, may be incorrect due to, for example, breakdown in the transmitting equipment. This will prevent the receiving director unit 11 from properly feeding the message following the incorrect routing information to the intended receiving device. The receiving director unit, if desired, may be operated to terminate such messages in receiving device 14. The messages transmitted by transmitter group C may be terminated in receiving device 15 rather than device 14, as occurs when only three receiving devices 12, 13 and 14 are used. It is to be understood that the use of four receiving devices is an alternative to the use of three and that either arrangement may be used.

Figure 2A:
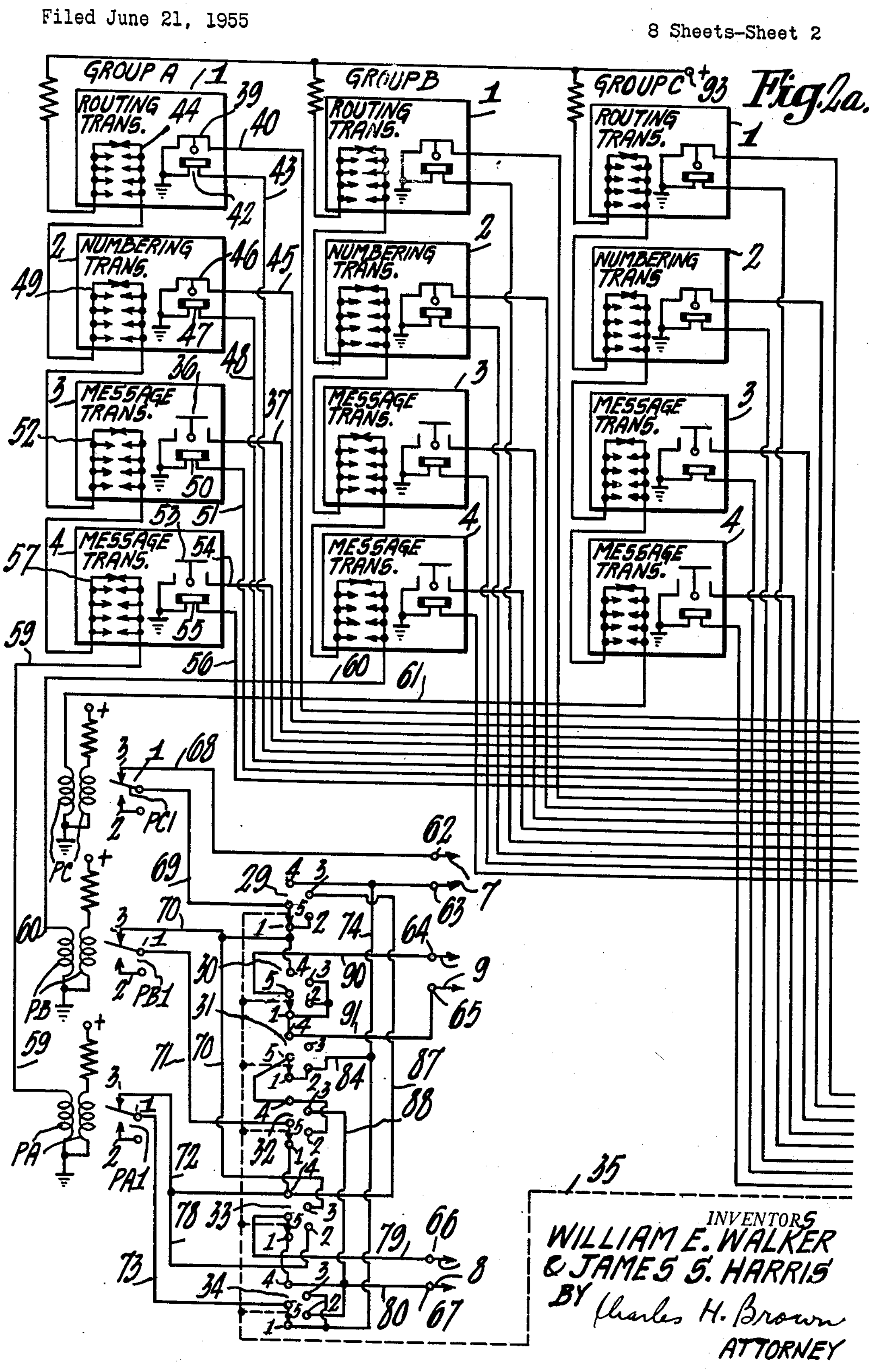

One embodiment of a transmitting terminal station suitable for use in the system shown in the block diagram of Fig. 1 is shown in Figs. 2*a*, 2*b*, 2*c* and 2*d*. Reference is also made to Fig. 3 which depicts the manner in which the Figs. 2*a*, 2*b*, 2*c* and 2*d* are to be assembled. Three groups of transmitters A, B and C are shown in Fig. 2*a*, each group including a routing transmitter 1, numbering transmitter 2, message transmitter 3 and message transmitter 4. The transmitters are operatively connected to a switching circuit which includes three switching sections A (Fig. 2*b*), B, (Fig. 2*c*) and C (Fig. 2*d*), each group of transmitters being operated by one of the switching sections. The three switching sections are identical in construction and, for ease of description, the corresponding relays in each section have been given the same letter designation. The relays of switching section A operating group A of the transmitters are indicated by the letter A preceding the letter designation, the relays of switching section B operating group B of the transmitters being indicated by the letter B preceding the letter designation and the relays of switching section C operating group C of the transmitters being indicated by the letter C preceding the letter designation. The operation of the three groups of transmitters by the respective switching sections of the switching circuit will in each case be the same. The sequence of operation of the relays in each section will also be the same. Individual control of the groups of transmitters is exercised by a selector control 6, referred to in connection with Fig. 1, which controls the overall operation of the switching circuit. The control 6 includes fifteen selector switches 20 through 34, each of the selector switches including four contact positions and a wiper 5. The wipers of each of the selector switches and the wiper 5 of selector control 6 are connected to and driven by a common shaft 35. Therefore, as the shaft 35 is rotated from one position to the next by the operation of the wiper 5 of control 6, the wipers of all of the selector switches, 20 through 34, will be simultaneously positioned in accordance with the movement of the shaft. It is the positioning of the wiper 5 of the selector control 6 and the resulting positioning of the wipers of selector switches 20 through 34 which controls the operation of the various switching sections of the switching circuit of the transmitting control unit and, therefore, the operation of each group of the transmitters. The wipers 5 of the selector switches and the wiper 5 of the selector control are shown in Figs. 2*a*, 2*b*, 2*c* and 2*d* as being connected together by a mechanical connection 35.

Inasmuch as the operation of each of the three switching sections of the switching circuit of the transmitting control unit is the same, only the operation of switching section A, shown in Fig. 2*b*, will be described. However, it is to be understood that the sequence of operation is exactly the same in switching sections B and C of the switching circuit. It will be assumed that an operator wishes to transmit a message by message transmitter 3 of group A of the transmitters. It will be further assumed that selector control switch 6 is set on position 1 and, therefore, that multiplex transmission is to be used. A perforated message tape is inserted in the sensing contacts of the transmitter 3, closing the contacts 36 which will remain closed during the transmission of a message from the message transmitter. Upon the closure of contacts 36, a path will be completed from ground to the positive terminal 92 of a source of potential, not shown, through contacts 36, lead 37, the winding of relay AH, contact 2 and armature 1 of transfer contacts AJ2 of relay AJ, break contacts BJ1 of relay BJ, break contacts BH1 of relay BH, lead 91 and lead 38. The term ground, as used in the specification, is to be considered as a point of zero or fixed reference potential. Upon the energization of relay AH, a path will be completed from ground to the positive terminal 92 through make contacts AH1, armature 1 and contact 3 of transfer contacts AC3 of relay AC, armature 1 and contact 3 of transfer contacts AE3 of relay AE, break contacts AG2 of relay AG, the winding of relay AA, wiper 5 and position 1 of selector switch 20, break contacts CD1 of relay CD, break contacts CB1 of relay CB and break contacts CA1 of relay CA. Relay AA is energized and a path will be completed from ground to the positive terminal 92 through the winding of relay AX, contact 3 and armature 1 of transfer contacts AA2 of relay AA and lead 38. Relay AX is energized and a path will be completed from ground to the positive terminal 92 through the winding of relay AB, make contacts AX1 of relay AX and lead 38. When relay AB is energized, a path will be completed from ground to the positive terminal 92 through contacts 39 of the routing transmitter 1 of transmitter group A, lead 40, the winding of relay AC, contact 2 and armature 1 of transfer contacts AD1 of relay AD, lead 41, position 1 and wiper 5 of selector switch 21, make contacts AB1 of relay AB and lead 38. Relay AC will be energized and make contacts AC2 of relay AC will close providing a holding circuit for the relay. Armature 1 of transfer contacts AC3 will disengage contact 3 and engage contact 2 of the transfer contacts. The ground connection to the winding of relay AA will be disconnected and, therefore, relay AA will be inactivated. Upon the inactivation of relay AA, armature 1 of transfer contacts AA2 will disengage contact 3 and engage contact 2 of the transfer contacts. The winding of relay AX will be disconnected from the positive terminal 92 and will be inactivated. Upon the inactivation of relay AX, make contacts AX1 of relay AX will open disconnecting the positive terminal 92 from the winding of relay AB, inactivating relay AB. Upon the inactivation of relay AB, a path will be completed from ground to the positive terminal 92 through the winding of the release magnet 42 of the routing transmitter 1 of transmitter group A, lead 43, make contacts AC4 of relay AC, break contacts AB2 of relay AB, contact 2 and armature 1 of transfer contacts AA2 of relay AA and lead 38. Relay AC will be held energized through make contacts AC2 of the relay which connect the winding of the relay to the positive terminal of a source of potential.

The winding of the release magnet 42 being energized, the routing transmitter will be operated to forward routing information to the distributing contacts 44 of the transmitter. The routing information may be perforated in a continuous tape fed to the routing transmitter or may be obtained in any other suitable manner. When the transmission of the routing information has been completed, the contacts 39 will be momentarily opened. Upon the opening of the contacts 39, the ground connection to the winding of relay AC via lead 40 will be disconnected and relay AC will be inactivated. When relay AC is inactivated, make contacts AC4 of the relay will open disconnecting the positive terminal 92 from the winding of the release magnet 42 of the routing transmitter 1. The winding will no longer be energized and the operation of the routing transmitter 1 will cease.

It will be remembered that upon the energization of relay AC, armature 1 of transfer contacts AC3 of relay AC disengaged contact 3 and engaged contact 2 of the transfer contacts. The operation of the transfer contacts completes a path from ground to the positive terminal 92 through make contacts AH1 of relay AH, armature 1 and contact 2 of transfer contacts AC3 of relay AC, the winding of relay AD and lead 38. Relay AD is energized and a holding circuit for relay AD will be established by the closing of make contacts AD2 of the relay, providing a ground connection for the winding of the relay. After the routing transmitter has completed the transmission of routing information and relay AC has been inactivated, only two relays of the switching section A of the switching circuit will remain activated, namely, relays AH and AD.

When relay AC is inactivated, the ground connection will once again be connected to the winding of relay AA through the armature 1 and contact 3 of the transfer contacts AC3 of relay AC. Relays AA, AX and AB will be energized in the same manner as outlined above. However, when relay AB operates, relay AC will not be operated, as previously occurred. This is so because the energization of relay AD caused armature 1 of transfer contacts AD1 of relay AD to disengage contact 2 and engage contact 3 of the transfer contacts. The operation of relay AB cannot complete a path from the positive terminal 92 to ground through the winding of relay AC. However, when relay AB operates, a path will be completed from the positive terminal 92 to ground through lead 38, make contacts AB1 of relay AB, wiper 5 and position 1 of selector switch 21, lead 41, armature 1 and contact 3 of transfer contacts AD1 of relay AD, break contacts AC1 of relay AC, armature 1 and contact 2 of transfer contacts AF1 of relay AF, the winding of relay AE, lead 45 and closed contacts 46 of numbering transmitter 2 of transmitter group A. Relay AE will be energized and the closing of make contacts AE1 of the relay will establish a holding circuit for the relay. Armature 1 of transfer contacts AE3 of relay AE will disengage contact 3 and engage contact 2 of the transfer contacts. The ground connection to the winding of relay AA will be disconnected and relay AA will be inactivated. Upon the inactivation of relay AA, relays AX and AB will also be inactivated, as outlined above. At the same time, a path will be completed from ground to the positive terminal 92 through make contacts AH1 of relay AH, armature 1 and contact 3 of transfer contacts AC3 of relay AC, armature 1 and contact 2 of transfer contacts AE3 of relay AE and the winding of relay AF. Relay AF will be energized and the closure of make contacts AF2 of the relay will establish a holding circuit for the relay. A further path will be completed from ground to the positive terminal 92 through the winding of the release magnet 47 of the numbering transmitter 2 of transmitter group A, lead 48, make contacts AE4 of relay AE, break contacts AB2 of relay AB, contact 2 and armature 1 of transfer contacts AA2 of relay AA and lead 38. The winding of the release magnet 47 of the numbering transmitter 2 of transmitter group A will be energized and the numbering transmitter 2 will be operated to forward one of a sequential group of numbers to the distributing contacts 49 of the numbering transmitter 2. When the transmitter has completed the transmission of a number, the contacts 46 will be momentarily opened, disconnecting the ground connection to the winding of relay AE via lead 45. Relay AE will be inactivated. The inactivation of relay AE causes make contacts AE4 of relay AE to open, disconnecting the positive terminal 92 from the winding of the release magnet 47 of the numbering transmitter. The numbering transmitter will cease operation. At this point, relays AD, AF and AH will be the only relays energized in the switching section A of the switching circuit.

When relay AE is inactivated, armature 1 of transfer contacts AE3 of relay AE will disengage contact 2 and engage contact 3 of the transfer contacts. The release of the transfer contacts AE3 will again connect the ground connection to the winding of relay AA, and relay AA will be energized. Relays AA, AX and AB will be energized in the same manner as outlined above. However, when relay AB is energized, neither relay AC nor relay AE can now be energized, as previously occurred. Relay AC cannot be energized due to the energization of relay AD which causes the armature 1 of transfer contacts AD1 of relay AD to disengage contact 2 and engage contact 3 of the transfer contacts. Relay AE cannot be energized due to the energization of relay AF which causes the armature 1 of transfer contacts AF1 of relay AF to disengage contact 2 and engage contact 3 of the transfer contacts. However, a path will be completed from the positive terminal 92 to ground through lead 38, make contacts AB1 of relay AB, wiper 5 and position 1 of selector switch 21, lead 41, armature 1 and contact 3 of transfer contacts AD1 of relay AD, break contact AC1 of relay AC, armature 1 and contact 3 of transfer contacts AF1 of relay AF, break contacts AE2 of relay AE, winding of relay AG and make contacts AH1 of relay AH. Relay AG will be energized and the closing of make contacts AG1 will establish a holding circuit for the relay. Break contacts AG2 of relay AG will open, disconnecting the ground connection to the winding of relay AA, inactivating relay AA. Relays AX and AB will also be inactivated in the same manner as outlined above. Upon the inactivation of relay AB, a path will be completed from ground to the positive terminal 92 through the winding of the release magnet 50 of the message transmitter 3 of transmitter group A, lead 51, make contacts AH3 of relay AH, make contacts AG3 of relay AG, break contacts AB2 of relay AB, contact 2 and armature 1 of transfer contacts AA2 of relay AA and lead 38. The winding of the release magnet 50 of the message transmitter 3 will be energized causing the transmitter to operate. The message to be transmitted will be forwarded to and retransmitted by the distributing contacts 52. When the transmission of the message has been completed, the contacts 36 of the message transmitter 3 of transmitter group A will be opened indicating the completion of the transmission. When contacts 36 open, the ground connection to the winding of relay AH via lead 37 is disconnected and relay AH will be inactivated. The inactivation of relay AH will cause make contacts AH1 of relay AH to open, disconnecting the ground connection to the windings of relays AG, AF and AD. All of the relays in the switching section A will be inactivated and the switching circuit will be returned to its original condition.

In sequentially controlling the operation of the transmitters of transmitter group A, provision must be made whereby the energization of the release magnet of a transmitter does not take place before the previous transmitter has completed the distribution of the message to be transmitted thereby. The sequence of operation, relay AA operated, relay AX operated, relay AB operated, relay AC, AE or AG operated, relay AA released, relay AX released, relay AB released, provides the necessary time interval for the transmission from the preceding transmitter to be completed before transmission from the next is started. To insure that the proper time interval exists, relays AB and AX are slow operate-slow release relays. There is provided enough delay in switching from one transmitter to the next to allow for the complete operation of each transmitter. The transmitters will be sequentially operated by the switching circuit so that no overlap of the respective messages transmitted therefrom will occur.

If message transmitter 4 of the transmitter group A were to have been operated instead of message transmitter 3 of the group, the exact same sequence of operation of the switching section A of the switching circuit would have followed with one exception. The closing of the contacts 53 of the message transmitter 4 by the insertion of a perforated message tape into the sensing contacts of the transmitter will operate relay AJ via lead 54 in the same manner that relay AH was operated via lead 37 by the closing of contacts 36 of message transmitter 3. The contacts of the relays AH and AJ are connected in parallel in the switching section A and, therefore, the closing of either set of contacts will bring about the same sequence of operation. The winding of the release magnet 55 of the message transmitter 4 will be energized through make contacts AJ3 of relay AJ via lead 56, the message being retransmitted from the distributing contacts 57 of the transmitter. The transmitter group A will be operated in exactly the same manner except that message transmitter 4 will be operated instead of message transmitter 3. An important point to note is that message transmitters 3 and 4 of group A cannot be operated simultaneously. Upon the closing of contacts 36 of message transmitter 3 by the insertion of a perforated message tape in the sensing contacts thereof, relay AH will be energized. Upon the energization of relay AH, the armature 1 of transfer contacts AH2 of the relay will disengage contact 2 and engage contact 3 of the transfer contacts. Relay AJ cannot be energized because the operation of transfer contacts AH2 of relay AH opens the circuit to the winding of relay AJ. In the same manner, the operation of relay AJ will cause transfer contacts AJ2 to operate and open the circuit to the winding of relay AH. Only one of the message transmitters 3 or 4 of group A can be operated at a time, the operation of one message transmitter automatically preventing the operation of the other by the energization of relay AH or relay AJ and the operation of the transfer contacts thereof.

Figure 2B:
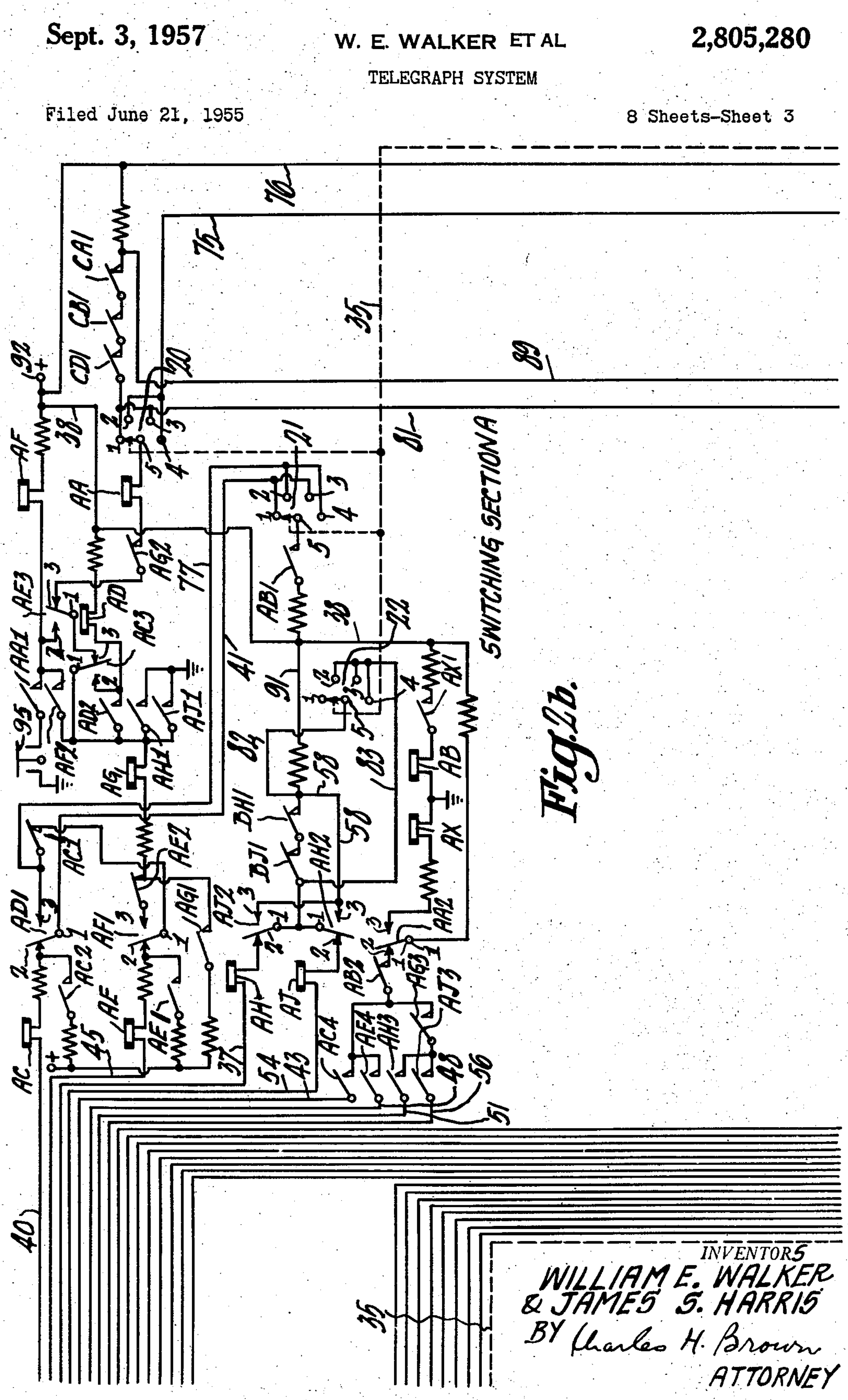
Figure 2C:
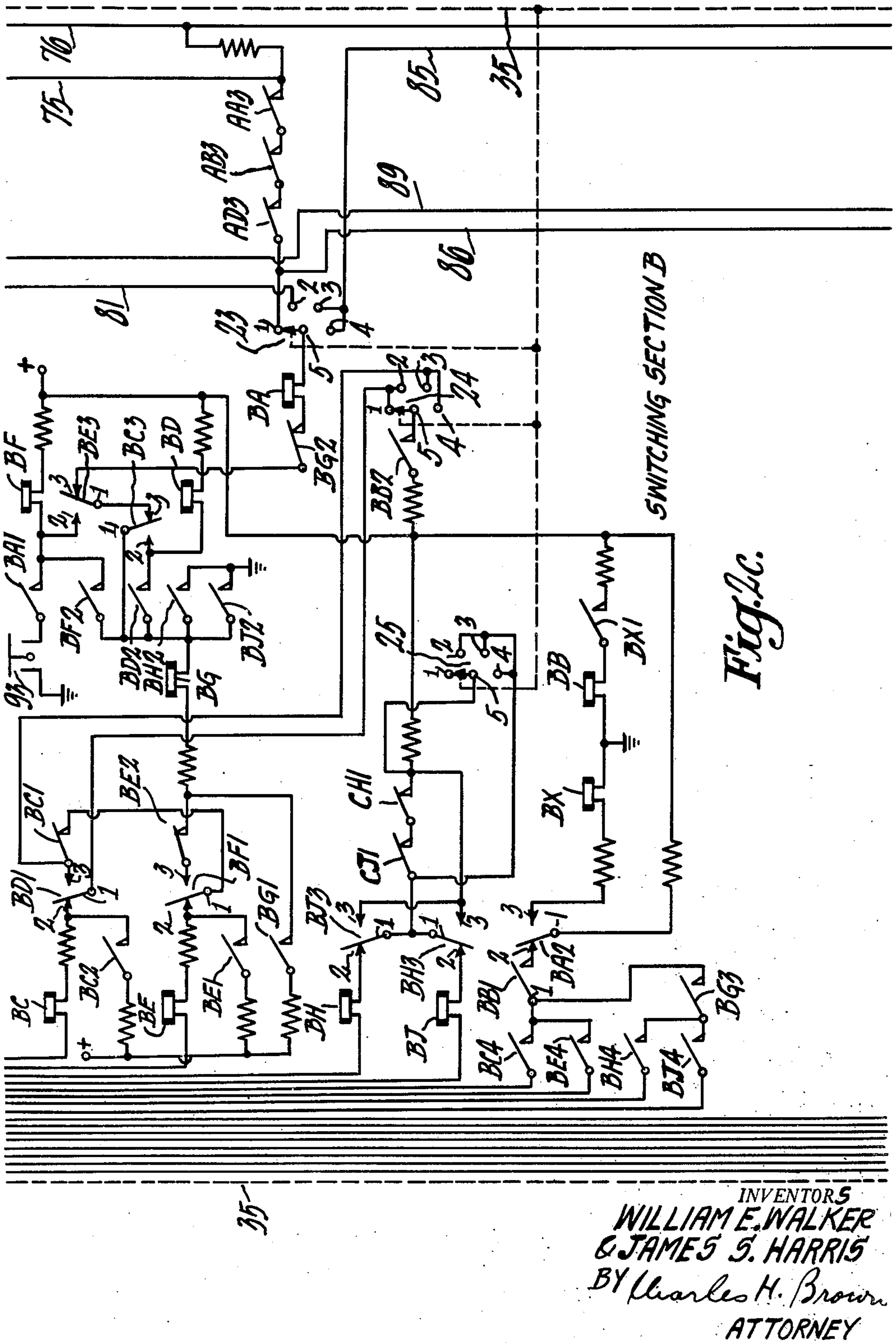
Figure 2D:
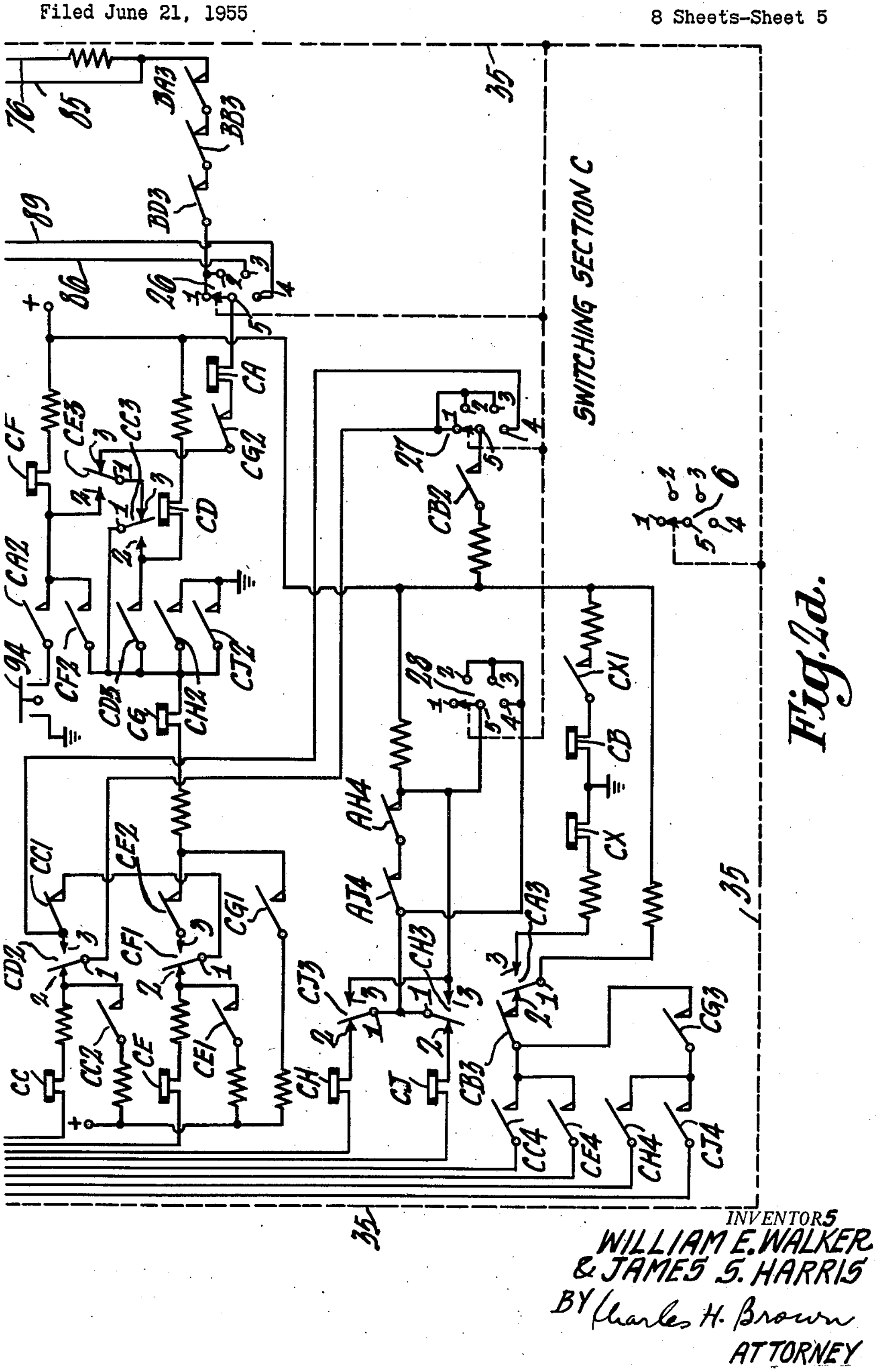

The discussion has been directed to the operation of transmitter group A by switching section A of the switching circuit, shown in Fig. 2*b*. As previously mentioned, the operation of transmitter group B is controlled by switching section B, shown in Fig. 2*c*, of the switching circuit and the operation of transmitter group C by switching section C, shown in Fig. 2*d*, of the switching circuit. The switching sections B and C will operate in the same sequence as does switching section A. Transmitter groups B and C will be controlled in the same manner by sections B and C, respectively, as was transmitter group A by switching section A. In other words, the switching circuit includes three switching sections, each section being the same in operation and construction. One of the switching sections, switching section A, controls the operation of transmitter group A, a second switching section, switching section B, the operation of transmitter group B and a third switching section, switching section C, the operation of transmitter group C. The operation of switching section A and transmitter group A having already been described, the description will not be repeated in connection with the switching sections B and C and transmitter groups B and C.

The control of the transmitting control unit is exercised by selector control 6. It is the positioning of the selector control 6 which controls the operation of the three switching sections of the switching circuit to control the operation of transmitter groups A, B and C, so that the transmitter groups will transmit over one or more transmission lines. It is evident from the description of the operation of switching section A of the switching circuit that the availability of a message for transmission by one of the message transmitters is registered at relay AH or AJ, depending upon which of the message transmitters 3 or 4 of transmitter group A is used. In the same manner, relays BH or BJ of switching section B of the switching circuit will register the availability of a message for transmission by message transmitters 3 or 4, respectively, of transmitter group B and relays CH and CJ of switching section C of the switching circuit will register the availability of a message for transmission by message transmitters 3 or 4, respectively, of transmitter group C. Actual transmission of the message is accomplished by the operation of the particular switching section, thereafter, starting with the energization of the relay A in each of the switching sections, namely, relay AA, BA or CA. Assuming that only a single transmission line is available or is needed for use and that, therefore, multiplex transmission is to be used, these two levels of activity are employed to sequentially rotate the availability of the single transmission line between the output circuits of the three groups of transmitters.

As will be remembered, when messages transmitted by each of the groups of transmitters are to be sequentially transmitted over a single transmission line, selector control 6 will be set on position 1. One of the message transmitters will be selected for use and a perforated message tape inserted in the sensing contacts of the transmitter. The availability of a message for transmission will be registered by one of the relays H or J of the switching circuit. Either relay AH, AJ, BH, BJ, CH or CJ will be energized. Break contacts BJ1 of relay BJ and break contacts BH1 of relay BH are connected in series with the windings and in the operating circuit of relays AH and AJ. Neither of the relays AH or AJ can be energized unless these two contacts are closed. In the same manner, break contacts CJ1 of relay CJ and break contacts CH1 of relay CH are connected in series with the windings and in the operating circuit of relays BH and BJ. Also in the same manner, break contacts AJ4 of relay AJ and break contacts AH4 of relay AH are connected in series with the windings and in the operating circuit of relays CH and CJ.

It will again be assumed that message transmitter 3 of transmitter group A has been selected for use and that switching section A of the switching circuit is in operation. Relay AH will be energized and will cause break contacts AH4 of the relay to open. The opening of the contacts opens the circuit to the windings of the relays CH and CJ and the relays cannot, therefore, be energized. The availability of a message for transmission by one of the message transmitters of transmitter group C cannot be registered by relays CH or CJ and, therefore, transmitter group C cannot be operated by the switching circuit so long as transmitter group A is in operation. However, since break contacts CJ1 of relay CJ and break contacts CH1 of relay CH remain closed due to the inactive status of relays CH and CJ, relay BH or BJ can be energized. The availability of a message for transmission by one of the message transmitters of transmitter group B may be registered by the energization of either relay BH or BJ. Therefore, while transmitter group A is in operation, the availability of a second message for transmission may be registered in switching section B of the switching circuit. The situation, therefore, is that switching section A of the switching circuit is in operation to bring about the transmission of a message from message transmitter 3 of transmitter group A. Switching section B of the switching circuit, by the operation of relay BH or BJ, is placed in condition for operation.

Assuming that transmitter groups A, B and C are being operated in multiplex fashion, the wiper 5 of selector control 6 will be positioned on position 1 and, therefore, selector switches 20 through 34 will also be set on position 1. Only one of the transmitter groups is to be operated at a time. However, switching section B of the switching circuit has been readied for operation by the energization of one of the relays BH or BJ. As in the sequence of operation of switching section A, the sequence of operation of the switching section B will be relay BH or BJ operated, relay BA operated, relay BX operated and so on. The continued operation of switching section B of the switching circuit depends on the energization of relay BA. In the operation of switching section A of the switching circuit, following the operation of relay AH, relay AA operates, relay AX operates, relay AB operates, relay AC operates, relay AD operates and so on. Relay AD will remain operated until transmitter group A has completed the transmission of a message from message transmitter 3 of the group.

Upon the energization of relay BH or BJ of switching section B of the switching circuit, a path will be completed from ground to the winding of relay BA through make contacts BH2 of relay BH or make contacts BJ2 of relay BJ, armature 1 and contact 3 of transfer contacts BC3 of relay BC, armature 1 and contact 3 of transfer contacts BE3 of relay BE and break contact BG2 of relay BG. However, the path from the winding of relay BA to the positive terminal 92 through wiper 5 and position 1 of selector switch 23, break contacts AD3 of relay AD, break contacts AB3 of relay AB and break contacts AA3 of relay AA will not be completed due to the open condition of one of the contacts in the path. As mentioned above, the sequence of operation of switching section A of the switching circuit is such that at least one of the relays AA, AB or AD will be energized at all times during the operation of switching section A and, therefore, one of the break contacts AA3, AB3 or AD3, in the path of the winding of relay BA, will be open. Switching section B of the switching circuit cannot be operated and, therefore, transmitter group B will not be placed in operation.

When relay AH operates, armature 1 of transfer contacts AH2 of relay AH will disengage contact 2 and engage contact 3 of the transfer contacts. The operation of the transfer contacts AH2 of relay AH will complete a path from the winding of relay AH to the positive terminal 92 through lead 58, lead 91 and lead 38. A holding circuit is established for the relay AH. When relay BH or BJ of switching section B of the switching circuit is energized, break contacts BH1 of relay BH or break contacts BJ1 of relay BJ in the original operating circuit of relay AH will open. However, relay AH will continue to be energized through the holding circuit established by lead 58 which removes the break contacts BJ1 and break contacts BH1 from the operating path of relay AH.

As soon as message transmitter 3 of transmitter group A has completed the transmission of a message, relay AH will be inactivated. Upon the inactivation of relay AH, all of the relays in switching section A of the switching circuit, then operated, will also be inactivated. Relay AD will be inactivated closing break contacts AD3 of the relay. A path is then completed from the winding of relay BA of switching section B to the positive terminal 92 through the break contacts AD3, AB3 and AA3. Relay BA will be energized and the sequence of operation outlined in connection with switching section A will occur in switching section B bringing about the operation of transmitter group B. Upon the inactivation of relay AH, armature 1 of transfer contacts AH2 of relay AH will disengage contact 3 and engage contact 2 of the transfer contacts. The holding circuit for the relay AH provided by the lead 58 will be disconnected from the winding of relay AH and the break contacts BH1 of relay BH and break contacts BJ1 of relay BJ will be reinserted in the operating circuit of the relay. As one of these contacts is now open due to the operation of relay BH or BJ of switching section B of the switching circuit, neither relay AH nor AJ can be energized and, therefore, transmitter group A cannot be placed in operation. Break contacts AH4 of relay AH in the operating circuit of relays CH and CJ of switching section C of the switching circuit will be closed. It is evident, in view of the above discussion, that during the period that switching section B is operating to control the operation of transmitter group B, switching section C of the switching circuit may be placed in a standby condition. The opening of break contacts BA3, BB3 or BD3 in the operating circuit of relay CA of switching section C prevents the actual operation of switching section C and, therefore, the operation of transmitter group C. Upon the completion of transmission by transmitter group B, switching section C will be operated and transmitter group C will be placed in operation to forward a message over the single channel of operation. While transmitter group C is in operation, switching section A of the switching circuit may be placed in standby condition. Upon the completion of transmission by transmitter group C, switching section A will be operated and transmitter group A will be placed in operation to forward a message over the single channel of operation. While transmitter group A is in operation, switching section B of the switching circuit may be placed in standby condition and so on.

The switching circuit of the transmitting control unit is, therefore, operated on two levels of activity to sequentially place the transmitter groups in operation. When transmitter group A is operating, transmitter group B may be prepared for subsequent operation and transmitter group C may not. The relays AA, AB and AD of switching section A of the switching circuit operate to prevent the actual operation of switching section B of the switching circuit and, therefore, transmitter group B. When transmitter group A ceases operation, transmitter group B will be operated, transmitter group C may be prepared for subsequent operation and transmitter group A may not. The relays BA, BB and BD of switching section B of the switching circuit operate to prevent the actual operation of switching section C of the switching circuit and, therefore, transmitter group C. When transmitter group B ceases operation, transmitter group C will be operated, transmitter group A may be prepared for subsequent operation and transmitter group B may not. The relays CA, CB and CD of switching section C of the switching circuit operate to prevent the actual operation of switching section A of the switching circuit and, therefore, transmitter group A. When transmitter group C ceases operation, transmitter group A will be operated and so on. The first level of activity, namely, the operation of relay AH, AJ, BH, BJ, CH or CJ will determine the particular transmitter of group A, B or C which is to be placed in operation. It will also determine the transmitter group which may be placed on standby condition. The second level of activity, namely, the operation of relay AA, BA or CA and the resulting operation of the contacts thereof in the operating circuits of the other relays will determine the particular one of the transmitter groups that is actually to be placed in operation.

It is not necessary that the transmitter groups be operated in the order recited above, namely, A, B and C. If no message is made available in any of the remaining message transmitters during the operation of one of them, the switching circuit will be returned to its original condition as soon as an operating message transmitter has completed its transmission. Any of the message transmitters including the one just operated may be placed in operation. In this situation, only one message will be available for transmission at a time by the message transmitters. The switching circuit, therefore, automatically and sequentially operates the transmitter groups in a predetermined order, namely, A, B and C, so long as a second message is made available for transmission by the insertion of a perforated message tape in the sensing contacts of one of the message transmitters of one of the transmitter groups not already in operation, as determined by the particular transmitter group already in operation. On the other hand, the switching circuit may be made to sequentially operate the transmitter groups in any order desired so long as the transmitter group in operation is permitted to complete the transmission of a message before a second message is made available for transmission by the insertion of a perforated message tape in the sensing contacts of one of the message transmitters of one of the other transmitter groups.

It will be helpful at this point to review the discussion. The wiper 5 of selector control 6 is positioned at position 1. The transmitters of transmitter groups A, B and C are operated to sequentially transmit messages over a single transmission line. The operation of transmitter group A is controlled by switching section A of the switching circuit, transmitter group B by switching section B of the switching circuit and transmitter group C by switching section C of the switching circuit. The switching circuit is operated in accordance with the positioning of the selector control 6. Only one of the switching sections of the switching circuit will be operated at a time and, therefore, only one of the transmitter groups will be operated at a time. Provision is made for a predetermined one of the switching sections to be placed in a standby condition during the operation of another one of the switching sections so that, immediately upon the completion of transmission by the transmitter group in operation, the switching section placed in standby condition may be operated. Upon the operation of the switching section, a second one of the transmitter groups will be operated to transmit a message over the single available transmission line. In this manner, the transmitter groups A, B and C may be continuously operated to sequentially transmit messages over the single transmission line.

Referring to Fig. 2*a*, the distributing contacts 44 of the routing transmitter 1, distributing contacts 49 of the numbering transmitter 2, distributing contacts 52 of the message transmitter 3 and distributing contacts 57 of the message transmitter 4 of transmitter group A are connected in series by lead 59 which completes a path from the positive terminal 93 of a source of potential, not shown, to ground through the distributing contacts of the respective transmitters of transmitter group A and the windings of a polar relay PA. The transfer contacts PA1 of the polar relay PA include an armature 1 and contacts 2 and 3. In the same manner, the distributing contacts of the four transmitters of transmitter group B are connected in series by lead 60 which completes a path from the positive terminal 93 of a source of potential to ground through the distributing contacts of the respective transmitters of transmitter group B and the windings of a polar relay PB. The polar relay PB includes transfer contacts PB1 which include an armature 1 and contacts 2 and 3. The distributing contacts of the four transmitters of transmitter group C are connected in series by lead 61 which completes a path from the positive terminal 93 of a source of potential to ground through the distributing contacts of the respective transmitters of transmitter group C and the windings of polar relay PC. The polar relay PC includes transfer contacts PC1 of the same type as those of polar relays PA and PB.

It will be remembered that the wiper 5 of selector control 6 is positioned on control position 1. Therefore, selector switches 29 through 34 are also set on position 1. A path will be completed from output terminal 62 to output terminal 63 through lead 68, contact 3 and armature 1 of transfer contacts PC1 of polar relay PC, lead 69, wiper 5 and position 1 of selector switch 29, lead 70, contact 3 and armature 1 of transfer contacts PB1 of polar relay PB, lead 71, wiper 5 and position 1 of selector switch 32, lead 72, contact 3 and armature 1 of transfer contacts PA1 of relay PA, lead 73, wiper 5 and position 1 of selector switch 34 and lead 74. Transmission line 7 is connected to terminals 62 and 63. Transmission line 7 is, therefore, connected to the output circuits of all of the transmitters through the transfer contacts PA1 of polar relay PA, PB1 of polar relay PB and PC1 of polar relay PC. As the transmitters of transmitter group A are sequentially operated, each transmitter will operate polar relay PA in accordance with the intelligence to be transmitted by that transmitter, namely, routing, numbering and message. The operation of polar relay PA will operate transfer contacts PA1 of the relay. Armature 1 of the transfer contacts PA1 will be driven between contacts 2 and 3 of the transfer contacts in accordance with the intelligence transmitted by the transmitters of transmitter group A. The operation of the transfer contacts PA1 of polar relay PA will key transmission line 7 and a message will be transmitted thereover. As the transmitters of transmitter group B are also sequentially operated, transfer contacts PB1 of polar relay PB will key transmission line 7 in accordance with the intelligence fed to polar relay PB. When the transmitters of transmitter group C are sequentially operated, transfer contacts PC1 of polar relay PC will key transmission line 7 in accordance with the intelligence fed to polar relay PC. The messages from each of the groups of transmitters A, B and C will be sequentially transmitted over the single transmission line 7.

Transmission line 8 may now become available for use in addition to transmission line 7. It will first be assumed that the volume of traffic being handled by transmitter group A justifies the use of an individual transmission line for that transmitter group. The wiper 5 of selector control 6 will be positioned on control position 2. Selector switches 20 through 34 will automatically be set on position 2 by the operation of shaft 35. A perforated message tape is inserted in the sensing contacts of one of the message transmitters 3 or 4 of transmitter group A. The availability of a message for transmission will be registered in switching section A of the switching circuit by the operation of relay AH or AJ, depending upon which of the message transmitters 3 or 4 is used. Upon the operation of one of the relays AH or AJ, make contacts AH1 of relay AH or make contacts AJ1 of relay AJ will close completing a path from ground to the positive terminal 92 through the closed one of the contacts, armature 1 and contact 3 of transfer contacts AC3 of relay AC, armature 1 and contact 3 of transfer contacts AE3 of relay AE, break contacts AG2 of relay AG, the winding of relay AA, wiper 5 and position 2 of the selector switch 20, lead 75 and lead 76. Relay AA will be energized. Relays AB and AX will then be energized in the same manner, as was previously described. Instead of relay AC being energized to energize the winding of the release magnet 42 of the routing transmitter 1 of transmitter group A by the closing of make contacts AC4 of relay AC, as previously occurred, a path will now be completed from the positive terminal 92 to ground through lead 38, make contacts AB1 of relay AB, position 2 of selector switch 21, lead 77, break contact AC1 of relay AC, armature 1 and contact 2 of transfer contacts AF1 of relay AF, the winding of relay AE, lead 45 and closed contacts 46 of numbering transmitter 2 of transmitter group A. The sequence of operation of switching section A of the switching circuit will, thereafter, be the same as previously outlined except that routing transmitter 1 of transmitter group A has not been operated.

The reason for by-passing the operation of the routing transmitter may be found by examining the output circuit of transmitter group A. When the wipers 5 of the selector switches 29 through 34 are set on position 2, contact 3 of transfer contacts PA1 of polar relay PA will be connected to terminal 66 via lead 72, lead 78, wiper 5 and position 2 of selector switch 33 and lead 79. Armature 1 of transfer contacts PA1 of polar relay PA will be connected to terminal 67 via lead 73, wiper 5 and position 2 of selector switch 34 and lead 80. Transmission line 8 is connected to terminals 66 and 67. The full capacity of transmission line 8 will be occupied by messages transmitted by transmitter group A. As separation of the line into a plurality of message channels at the receiving station is not necessary, the routing information will be of no value. Provision, therefore, is made in the switching section A to by-pass the operation of the routing transmitter of transmitter group A when the wiper 5 of selector control 6 is set on position 2.

A second message may be inserted in the sensing contacts of one of the message transmitters 3 or 4 of transmitter group B. The availability of the message for transmission will be registered in switching section B of the switching circuit by the operation of relay BH or BJ. Upon the operation of one of the relays, a path will be completed from ground to the positive terminal 92 through the closed make contacts BH2 of relay BH or make contacts BJ2 of relay BJ, armature 1 and contact 3 of transfer contacts BC3 and relay BC, armature 1 and contact 3 of transfer contacts BE3 of relay BE, break contacts BG2 of relay BG, the winding of relay BA, wiper 5 and position 2 of selector switch 23, lead 81, break contacts CD1 of relay CD, break contacts CB1 of relay CB and break contacts CA1 of relay CA. Relay BA will be energized and switching section B will operate to control sequentially the operation of the transmitters of transmitter group B.

A third message may, then, be inserted in the sensing contacts of one of the message transmitters 3 or 4 of transmitter group C. The availability of the message for transmission will be registered in switching section C by the operation of relay CH or CJ. Upon the energization of either relay CH or CJ, a path will be completed from ground to the winding of relay CA through closed make contacts CH2 of relay CH or make contacts CJ2 of relay CJ, armature 1 and contact 3 of transfer contacts CC3 of relay CC, armature 1 and contact 3 of transfer contacts CE3 of relay CE, and break contact CG2 of relay CG. The winding of relay CA is connected to the positive terminal 92 through wiper 5 and position 2 of selector switch 26, break contacts BD3 of relay BD, break contacts BB3 of relay BB and break contacts BA3 of relay BA. When switching section B is operated, contacts BA3 of relay BA, BB3 of relay BB and BD3 of relay BD will open in that order, contacts BD3 of relay BD remaining open due to the continued energization of relay BD so long as transmitter group B is transmitting a message. Because the operating circuit of relay CA is broken by the opening of the contacts of relays BA, BB and BD, relay CA cannot operate. Therefore, so long as transmitter group B is in operation, switching section C of the switching circuit cannot operate and cannot bring about the operation of transmitter group C.

It will be remembered that the break contacts CD1 of relay CD, break contacts CB1 of relay CB and break contacts CA1 of relay CA are included in the operating circuit of relay BA of switching section B of the switching circuit. Therefore, when switching section C is operating, at least one of these contacts will be open and relay BA cannot be energized. Switching section B, therefore, cannot operate so long as switching section C of the switching circuit is operating and controlling the operation of transmitter group C. Transmitter group B cannot be operated so long as transmitter group C is operating.

Reference was made earlier to the first level of activity in each of the three switching sections A, B and C of the switching circuit. Attention is now called to selector switch 22 in switching section A, selector switch 25 in switching section B and selector switch 28 in switching section C of the switching circuit. When the wiper 5 of selector control 6 is set on position 2, the wiper 5 of each of these switches will automatically be set on position 2. When the wiper 5 of selector switch 22 is set on position 2, a path is completed from the positive terminal 92 to the windings of relays AH and AJ via lead 38, lead 91, lead 82, wiper 5 and position 2 of selector switch 22, lead 83 and the transfer contacts AH2 of relay AH and AJ2 of relay AJ. The break contacts BJ1 of relay BJ and break contacts BH1 of relay BH are by-passed. Relays AH and AJ may be operated regardless of the condition of these contacts. Selector switch 25 in switching section B operates the same way. The break contacts CJ1 of relay CJ and break contacts CH1 of relay CH are by-passed and relays BH and BJ may be operated regardless of the condition of these contacts. Selector switch 28 in switching section C also operates in the same way. The break contacts AJ4 of relay AJ and AH4 of relay AH are by-passed and relays CH and CJ may be operated regardless of the condition of these contacts. There is no control exercised at the first level of activity while the wiper 5 of the selector control 6 is set on position 2.

The reason for eliminating the first level of activity when the selector control 6 is set on position 2 is apparent. It will be remembered that when all three transmitter groups A, B and C are being sequentially operated and switching section A is in operation, switching section B may be placed on standby condition and switching section C may not be operated in any way. When switching section B is in operation, switching section C may be placed in standby condition and switching section A may not be operated in any way. When switching section C is operated, switching section A may be placed on standby condition and switching section B may not be operated in any way. When the selector control 6 is set on position 2, however, the switching circuit will be operated to interlock the operation of switching sections B and C only. Switching section A operates independently and is not controlled in any way by the operation of switching sections B and C. It is necessary, therefore, to effectively remove this level of activity from the switching circuit to permit only the switching sections B and C to be sequentially operated. As pointed out above, when all three transmitter groups are operated sequentially and switching section B is in operation, switching section C may be placed in standby condition. However, when switching section C is in operation, switching section B cannot be operated in any way. It has already been shown how the operation of selector switch 22 removes any control over relays AH and AJ of switching section A by the other switching sections. This, of course, is necessary to permit the complete independent operation of switching section A and, therefore, that of transmitter group A over transmission line 8. The operation of the selector switches 22, 25 and 28 removes from the operating circuits of relays AH, AJ, BH, BJ, CH and CJ the respective break contacts of the relays. The only control exercised over the switching circuits is therefore the interlocking contacts of switching sections B and C on the second level of activity referred to above, namely, the controlled operation of relays BA and CA.

It has already been mentioned that the routing transmitter of transmitter group A will not be operated due to the setting of selector switch 21 in switching section A of the switching circuit on position 2. It would be well to note that the selector switches in switching sections B and C corresponding to selector switch 21 in switching section A, namely, selector switch 24 in switching section B and selector switch 27 in switching section C, when placed on position 2 bring about no change in the electrical arrangement of the respective switching sections. Position 2 and position 1 of switch 24 are connected together, as are the same positions of switch 27. The switching sections will operate in the same manner as before, including the operation of the routing transmitters. Transmitter groups B and C are sequentially operated over transmission line 7 and the routing information is necessary to control the distribution of the messages transmitted by the respective transmitter groups at the receiving station.

The output circuits of the transmitters of transmitter group A will be connected to an individual transmission line 8 and, as only the transmitters of transmitter group A will be transmitting over line 8, there is no need for routing information. For this reason, the routing transmitter of transmitter group A is not operated during the operation of section A of the switching circuit with the control 6 in position 2. As for transmitter groups B and C, a path may be traced from terminal 62 to terminal 63 via lead 68, contact 3 and armature 1 of transfer contacts PC1 of polar relay PC, lead 69, wiper 5 and contact position 2 of selector switch 29, lead 70, contact 3 and armature 1 of transfer contacts PB1 of polar relay PB, lead 71, wiper 5 and position 2 of selector switch 32, wiper 5 and position 2 of selector switch 31, lead 84 and lead 74. Therefore, both transmitter group B and transmitter group C will be operated to sequentially transmit messages over line 7. Line 7 will be keyed by the transfer contacts PB1 of polar relay PB which is connected to the output circuits of the transmitters of transmitter group B via lead 60 and the transfer contacts PC1 of polar relay PC which is connected to the output circuits of the transmitters of transmitter group C via lead 61.

It may now be desirable that transmitter group B be connected to the individual transmission line 8 and that transmitter groups A and C be sequentially operated over transmission line 7. The wiper 5 of the selector control 6 will be positioned at position 3. Simultaneously, the wipers 5 of selector switches 20 through 34 will also be positioned at position 3 of the respective switches. A perforated message tape may, then, be inserted in the sensing contacts of one of the message transmitters 3 or 4 of transmitter group A. The availability of the message is registered in switching section A of the switching circuit by the operation of either relay AH or AJ, respectively. Upon the operation of either relay AH or AJ, a path will be completed from ground to the positive terminal 92 through either make contacts AH1 of relay AH or make contacts AJ1 of relay AJ, armature 1 and contact 3 of transfer contacts AC3 of relay AC, armature 1 and contact 3 of transfer contacts AE3 of relay AE, break contacts AG2 of relay AG, the winding of relay AA, wiper 5 and position 3 of selector switch 20, break contacts CD1 of relay CD, break contacts CB1 of relay CB and break contacts CA1 of relay CA. Relay AA will be energized and switching section A of the switching circuit will operate to sequentially control the operation of the transmitters of transmitter group A. When the wiper 5 of selector switch 21 is positioned at position 3 of the switch, following the operation of relay AX and AB, a path will once again be completed from the positive terminal 92 to ground through lead 38, make contact AB1 of relay AB, wiper 5 and position 3 of selector switch 21, lead 41, armature 1 and contact 2 of transfer contacts AD1 of relay AD, the winding of relay AC, lead 40 and closed contacts 39 of the routing transmitter 1 of transmitter group A. Relay AC will be energized and the winding of the release magnet 42 of the routing transmitter will be energized by the closing of make contacts AC4 of relay AC. The remainder of the transmitters of transmitter group A will be sequentially operated by switching section A of the switching circuit, as previously outlined.

A second perforated message tape may be inserted in the sensing contacts of one of the message transmitters 3 or 4 of transmitter group B. The availability of the message for transmission will be registered by the operation of relay BH or BJ in switching section B of the switching circuit. Upon the operation of either relay BH or BJ, a path will be completed from ground to the positive terminal 92 through make contacts BH2 of relay BH or make contacts BJ2 of relay BJ, armature 1 and contact 3 of transfer contacts BC3 of relay BC, armature 1 and contact 3 of transfer contacts BE3 of relay BE, break contacts BG2 of relay BG, the winding of relay BA, wiper 5 and position 3 of selector switch 23, lead 85 and lead 76. Relay BA will be energized and switching section B of the switching circuit will be operated to sequentially operate the transmitters of transmitter group B. Following the operation of relay BA, relays BX and BB will be operated. Upon the operation of relay BB, a path will be completed from the positive terminal 92 to ground through a circuit including wiper 5 and position 3 of selector switch 24 and the winding of relay BE. When relay BE is energized, the winding of the release magnet 47 of the numbering transmitter 2 of transmitter group B will be energized and the numbering transmitter will be placed in operation. The sequence of operation of switching section B of the switching circuit will continue and the transmitters of transmitter group B, with the exception of the routing transmitter, will be sequentially operated, as outlined above. The operation of the routing transmitter is prevented by the setting of wiper 5 of selector switch 24 on position 3, thereby, energizing relay BE and by-passing the operation of relay BC which would normally occur. Transmitter group B may, therefore, be operated simultaneously with transmitter group A, there being no interlocking control exercised by the operation of the relays of the two switching sections A and B.

A third perforated message tape may, thereafter, be inserted in the sensing contacts of one of the message transmitters 3 or 4 of transmitter group C. The availability of the message for transmission will be registered in switching section C of the switching circuit by the energization of either relay CH or CJ, respectively. Upon the energization of one of the relays, a path will be completed from ground to the winding of relay CA through either make contacts CH2 of relay CH or make contacts CJ2 of relay CJ, armature 1 and contact 3 of transfer contacts CC3 of relay CC, armature 1 and contact 3 of transfer contacts CE3 of relay CE and break contact CG2 of relay CG. The winding of relay CA will be connected to the positive terminal 92 through wiper 5 and position 3 of selector switch 26, lead 86, break contacts AD3 of relay AD, break contacts AB3 of relay AB, break contacts AA3 of relay AA and lead 76. The sequence of operation of switching section A of the switching circuit is such as that at least one of the break contacts AD3, AB3 or AA3 will be open during the operation of the switching section A to control the operation of transmitter group A. Relay CA cannot, therefore, be operated so long as transmitter group A is being operated by switching section A of the switching circuit. Because relay CA cannot be operated, transmitter group C cannot be operated by the operation of switching section C of the switching circuit. If switching section C should be placed in operation before switching section A of the switching circuit by the insertion of a message tape in the sensing contacts of one of the message transmitters of transmitter group C, the operation of switching section C will prevent the operation of switching section A by maintaining at least one of the break contacts CD1 of relay CD, break contacts CB1 of relay CB or break contacts CA1 of relay CA connected in the operating circuit of relay AA in open condition. Transmitter group A, therefore, cannot be operated so long as transmitter group C is in operation.

The wipers 5 of the selector switches 29 through 34 will be set on position 3 of the switches. Terminal 62 will be connected to terminal 63 via lead 68, contact 3 and armature 1 of transfer contacts PC1 of polar relay PC, lead 69, wiper 5 and position 3 of selector switch 29, lead 87, lead 72, contact 3 and armature 1 of transfer contacts PA1 of polar relay PA, lead 73, wiper 5 and position 3 of selector switch 34 and lead 74. Transmission line 7 is connected through terminals 62 and 63 to the transfer contacts PC1 of polar relay PC and transfer contacts PA1 of polar relay PA. The operation of the polar relay PA by the operation of the transmitters of transmitter group A via lead 59 and the operation of the polar relay PC by the operation of the transmitters of transmitter group C via lead 61 will serve to forward messages by the operation of the transfer contacts PA1 and PC1 over the line 7. The switching circuit of the transmitting control unit will be operated so that transmitter group A and transmitter group C will be operated to sequentially transmit messages over line 7. Terminal 66 will be connected to terminal 67 via lead 79, wiper 5 and position 3 of selector switch 33, lead 70, contact 3 and armature 1 of transfer contacts PB1 of polar relay PB, lead 71, wiper 5 and position 3 of selector switch 32, lead 88 and lead 80. Transmission line 8 is connected through terminals 66 and 67 to the transfer contacts PB1 of polar relay PB. Polar relay PB will be operated in accordance with the messages forwarded to the relay via lead 60 by the transmitters of transmitter group B. The operation of polar relay PB will, of course, key the transmission line 8 by the operation of the transfer contacts PB1 associated therewith. The full capacity of the transmission line 8 will be occupied by the messages forwarded thereover by transmitter group B. As only one of the transmitter groups transmits over the line, there is no need for the routing information to be forwarded by the routing transmitter 1 of the transmitter group. As has been pointed out, switching section B of the switching circuit will be operated so that the routing transmitter 1 of transmitter group B will not be placed in operation.

Referring to selector switch 22 of switching section A, selector switch 25 of switching circuit B and selector switch 28 of switching section C, position 3 of each of the switches is connected directly to position 2 of the respective switches. When selector control 6 is set on position 3, the only control exercised by the switching circuit will be the interlocking control brought about by the operation of the relays of switching sections A and C. Switching section B will be independently operated and no control will be exercised thereover by the other switching sections. As position 3 and position 2 of each switch are connected together, the same condition will exist as did when selector control 6 was set on position 2. The only control exercised by the switching circuit will be on the second level of activity, namely, the inter-locking control brought about by the operation of relay AA of switching section A and relay CA of switching section C.

During certain periods, all three transmission lines 7, 8 and 9 may become available for use and the volume of traffic handled by the system may warrant the use of all three lines. The wiper 5 of selector control 6 is set on position 4. Simultaneously and automatically, the wipers 5 of the selector switches 20 through 34 will be set on position 4 by the operation of the common drive shaft 35. A perforated message tape is then inserted in the sensing contacts of one of the message transmitters 3 or 4 of transmitter group A. The availability of a message for transmission will be registered in switching section A of the switching circuit of the transmitting control unit by the energization of either relay AH or AJ, depending upon the message transmitter used. The energization of relay AH or AJ will complete a path from ground to the positive terminal 92 through the make contacts AH1 of relay AH or make contacts AJ1 of relay AJ, armature 1 and contact 3 of transfer contacts AC3 of relay AC, armature 1 and contact 3 of transfer contacts AE3 of relay AE, break contacts AG2 of relay AG, the winding of relay AA, wiper 5 and position 4 of selector switch 20, lead 75 and lead 76. Relay AA will be energized. Position 4 of selector switch 21 is connected to position 2 of the switch. Therefore, the selector switch 21 will again be arranged in the switching section A in the same manner as when the wiper 5 of the switch is set on position 2. It will be remembered that when the switch is set on position 2, the routing transmitter 1 of transmitter group A will not be operated, the switching section A operating to sequentially operate the transmitters of group A starting with the numbering transmitter 2 of the group.

A second message tape may be inserted in the sensing contacts of one of the message transmitters 3 or 4 of transmitter group B. The availability of the message for transmission will be registered in switching section B by the energization of relay BH or BJ. Upon the energization of one of the relays, a path will be completed from ground to the positive terminal 92 through make contacts BH2 of relay BH or make contacts BJ2 of relay BJ, armature 1 and contact 3 of transfer contacts BC3 of relay BC, armature 1 and contact 3 of transfer contacts BE3 of relay BE, break contacts BG2 of relay BG, the winding of relay BA, wiper 5 and position 4 of selector switch 23, lead 85 and lead 76. Relay BA will be energized. Position 4 of selector switch 24 is connected to position 3 of the switch and the switch will be arranged in the switching section B in the same manner as when the wiper 5 of the switch is set on position 3. The routing transmitter 1 of transmitter group B will not be operated and the switching section B will be operated to sequentially operate the transmitters of transmitter group B starting with the numbering transmitter 2 of the group.

A third message tape may be inserted in the sensing contacts of one of the message transmitters 3 or 4 of transmitter group C. The availability of the message for transmission is registered in switching section C of the switching circuit of the transmitting control unit by the energization of either relay CH or CJ. Upon the energization of one of the relays, a path will be completed from ground to the positive terminal 92 through make contacts CH2 of relay CH or make contacts CJ2 of relay CJ, armature 1 and contact 3 of transfer contact CC3 of relay CC, armature 1 and contact 3 of transfer contacts CE3 of relay CE, break contacts CG2 of relay CG, the winding of relay CA, wiper 5 and position 4 of selector switch 26, lead 89 and lead 76. Relay CA will be energized. Selector switch 27 will be arranged in switching section C in the same manner that selector switch 24 is connected in switching section B and selector switch 21 is connected in switching section A. The relays of switching section C will be operated in the sequence previously outlined in connection with switching sections A and B to sequentially operate the transmitters of transmitter group C starting with the numbering transmitter 2 of the group. As in the case of transmitter groups A and B, the routing transmitter of transmitter group C will not be operated.

Selector switches 22, 25 and 28 of the respective switching sections A, B and C will be set on position 4. Position 4 is connected to position 2 and 3 on each of the switches. There will be no change in the operation of the switching sections by setting these switches to the new position. The switching sections will exercise no control over one another, each section operating independently from the others. As all three switching sections may be operated simultaneously due to the absence of any interlocking control on the second level of activity, namely, the control of the operation of relays AA, BA and CA, transmitter groups A, B and C may be operated simultaneously, sequentially or in any time relation or order desired.

Terminal 62 will be connected to terminal 63 via lead 68, contact 3 and armature 1 of transfer contacts PC1 of polar relay PC, lead 69 and wiper 5 and position 4 of selector switch 29. Terminal 64 will be connected to terminal 65 via lead 90, wiper 5 and position 4 of selector switch 30, lead 70, contact 3 and armature 1 of transfer contacts PB1 of polar relay PB, lead 71, wiper 5 and position 4 of selector switch 32, wiper 5 and position 4 of selector switch 31 and lead 91. Terminal 66 will be connected to terminal 67 via lead 79, wiper 5 and position 4 of selector switch 33, lead 72, contact 3 and armature 1 of transfer contacts PA1 of polar relay PA, lead 73, wiper 5 and position 4 of selector switch 34 and lead 80. Transmission line 7 will be connected to the output circuits of the transmitters of transmitter group C through the operation of the transfer contacts PC1 of polar relay PC. Transmission line 8 will be connected to the output circuits of the transmitters of transmitter group A through the operation of transfer contacts PA1 of polar relay PA and transmission line 9 will be connected to the output circuits of the transmitters of transmitter group B through the operation of the transfer contacts PB1 of polar relay PB. Each of the transmitter groups will be connected to an individual transmission line. As individual transmission lines are assigned to each transmitter group, it is not necessary to control the operation thereof as in multiplex transmission and the transmitter groups may be independently operated in any order desired.

A further feature of the telegraph system of the invention should be mentioned at this time. During the operation of the transmitter groups, it is now and then necessary to transmit information other than the regular message traffic. Such information may be in the nature of operating instructions and so forth. Referring to switching section A of the switching circuit, shown in Fig. 2*b*, of the transmitting control unit, a push button 95 is connected in series with the winding of relay AF. When the switching section A is in operation controlling the operation of transmitter group A, the push button 95 will be pressed. When relay AA operates in the sequence of operation of the switching section A, a path will be completed from ground to the positive terminal 92 through the closed contacts of push button 95, make contacts AA1 of relay AA and the winding of relay AF. Relay AF will be energized and will be self-locked by the closing of make contacts AF2 of the relay. It will be remembered that the operation of the numbering transmitter required the energization of relay AE. The energization of relay AF by the push button 95 will cause relay AG to be energized in any sequence in place of relay AE. As relay AE is not energized, transmission from the numbering transmitter of the transmitter group A will be withheld. The make contacts AA1 of relay AA in series with the push button 95 prevent the inadvertent operation of the push button from being effective. The push button is effective only during the operation of the switching section A and during the operation of relay AA. A push button 93 is connected in series with the winding of relay BF in switching section B and a push button 94 is connected in series with the winding of relay CF in switching section C. Push buttons 93 and 94 will operate in the same manner as does push button 95 in the switching section A. The push buttons 95, 93 and 94 may, therefore, be used to prevent transmission from the numbering transmitters included in each of the transmitter groups. It is clear that the use of each of the push buttons is individual to the switching section in which it appears. The operation of one of the push buttons serves to prevent the operation of the numbering transmitter of the transmitter group controlled by the particular switching section in which the push button appears. The operation of the switching circuit of the transmitting control unit is affected by the operation of the push buttons in no other way.

To review the operation of the transmitting control unit as shown in Figs. 2*a*, 2*b*, 2*c* and 2*d*, when the wiper 5 of selector control 6 is set at position 1, switching sections A, B and C of the unit will be interlocked so that the transmitter groups A, B and C will be operated to sequentially transmit messages over the single transmission line 7. At position 2 of selector control 6, switching section A will operate transmitter group A to transmit messages over transmission line 8. Switching sections B and C will be interlocked so that transmitter groups B and C will sequentially transmit messages over transmission line 7. At position 3 of the selector control 6, switching section B will operate transmitter group B to transmit messages over transmission line 8. Switching sections A and C will be interlocked so that transmitter groups A and C will sequentially transmit messages over transmission line 7. At position 4 of the selector control 6, switching section A will operate transmitter group A to transmit messages over transmission line 8. Switching section B will operate transmitter group B to transmit messages over transmission line 9 and switching section C will operate transmitter group C to transmit messages over transmission line 7.

Figure 4A:
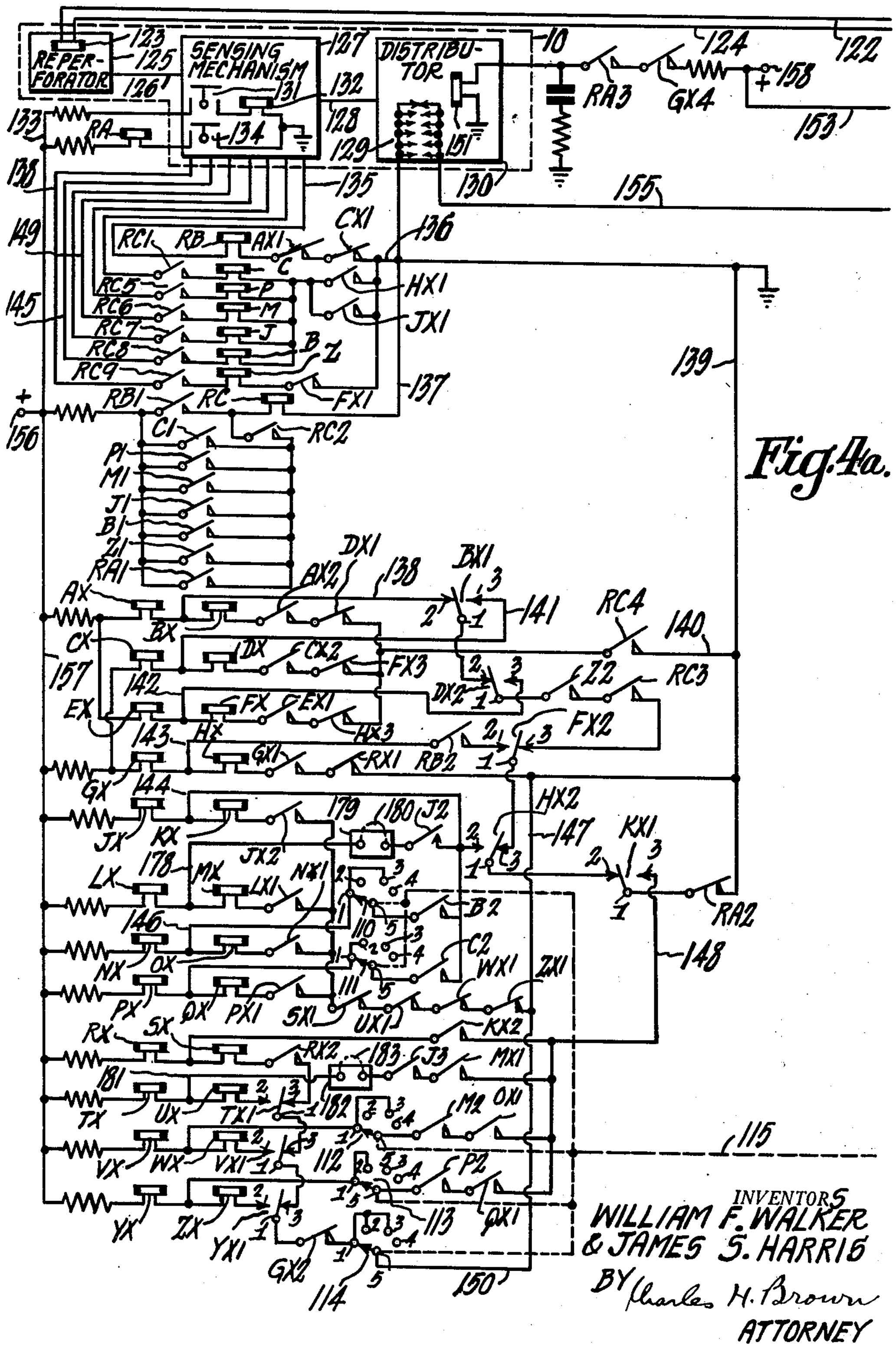
Figures 4B, 5:
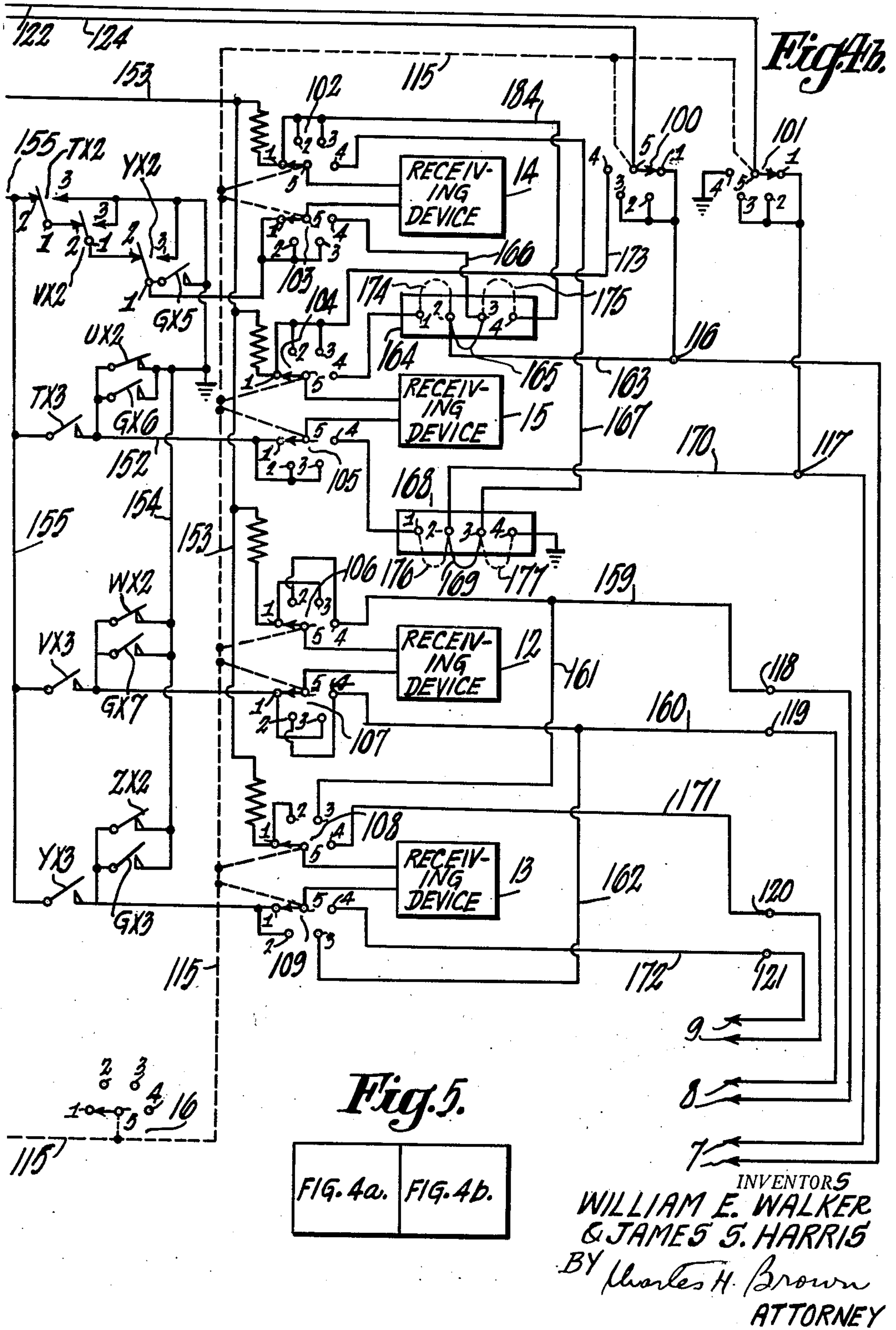

Reference will now be made to Figs. 4*a* and 4*b* which disclose one embodiment of a receiving terminal station that may be used in the telegraph system of the invention, shown in the block diagram of Fig. 1. Fig. 5 depicts the manner in which Figs. 4*a* and 4*b* are to be assembled. The operation of the receiving director unit is based on the fact that, when at least two of the transmitter groups A, B and C are operated to collectively and sequentially transmit messages over a single transmission line, the messages from each transmitter group will be preceded by routing information indicating the destination of each of the messages so transmitted. It will be assumed that each of the three transmitter groups is set to transmit messages to different destinations. The messages transmitted by transmitter group A will be sent to one destination. The messages transmitted by transmitter group B will be sent to another destination and the messages transmitted by transmitter group C will be sent to still another destination. The routing information transmitted by the routing transmitter 1 of transmitter group A will indicate the destination of the messages transmitted by message transmitters 3 and 4 of the group. In the same manner, the routing information transmitted by the routing transmitters of transmitter groups B and C will indicate the destination of the messages transmitted by the message transmitters 3 and 4 of the transmitter groups B and C. The make-up of the routing information so transmitted is, of course, a matter of choice. The receiving director unit may be constructed to respond to any information, which will act as routing information, to control the distribution of messages transmitted over a single transmission line among a plurality of receiving devices. It is desirable, however, that the routing information include a sequence of code characters which do not normally appear in the regular message traffic transmitted over the line. By using such a combination of characters, the receiving director unit will not be accidentally operated due to the reception of the character or characters included in the routing information during the reception of a message, as transmitted by one of the message transmitters at the transmitting station. In the receiving director unit to be described, the routing information transmitted by each of the routing transmitters comprises a series of eight characters. The first five of these characters consist of signals whose function is to disconnect the single transmission line from its previous termination. The next two characters function to again terminate the transmission line in accordance with their construction, and the remaining character performs local functions at the receiving director unit. The first five characters of the routing information will, hereinafter, be referred to as the disconnect signal. In the instant case, the disconnect signal will consist of the character sequence "figure shift, Z, Z, Z, figure shift." The character combinations "CP," "BM" and "JJ" have been chosen as directing character combinations to act as a connect signal to re-establish the proper termination of the line at the receiving director unit. The eighth character will be the character "letters shift" to bring the receiving devices at the receiving station into the lower case. The routing transmitter of transmitter group A will be set to repetitiously transmit the disconnect signal plus the directing character combination "BM." The routing transmitter of transmitter group B will be set to repetitiously transmit the disconnect signal plus the directing character combination "CP," and the routing transmitter of transmitter group C will be set to repetitiously transmit the disconnect signal plus the directing character combination "JJ."

As discussed in connection with the block diagram of Fig. 1, the receiving director unit 11 includes a selector control 16 comprising a wiper 5 and four positions. The four positions of the selector control 16 of the receiving director unit 11 correspond to the four control positions of the selector control 6 of the transmitting control unit 90. As shown in Figs. 4*a* and 4*b*, the selector control 16 comprises fifteen selector switches 100 through 114. Each of the selector switches includes a wiper 5 and four positions. The wipers 5 of all the selector switches are mounted on and driven by a common drive shaft 115. As the wiper 5 of selector control 16 is rotated from one position to the next, the wipers 5 of the selector switches 100 through 114 will also, simultaneously and automatically, be rotated from one position of the respective switches to the next. When selector control 16 is set at position 1, all of the selector switches will also be set at position 1 and so on.

Three transmission lines 7, 8 and 9 are shown at the lower right corner of Fig. 4*b*. The three lines correspond to the transmission lines connected to the terminals of the transmitting control unit shown in Fig. 2*a*. Regular land lines may be used for lines 7, 8 and 9 to connect the transmitting control unit and the receiving director unit. However, the particular means for communicating between the two points may be chosen on the basis of available equipment, the topography of the surface area between the stations and many other reasons. For example, radio frequency communication may be used to forward the messages over the three lines in certain applications.

It will first be assumed that the transmitter groups A, B and C are being operated to sequentially transmit messages over transmission line 7. The wiper 5 of selector control 16 will be set at position 1 and, accordingly, the wiper 5 of selector switches 100 through 114 will also be set at position 1. The transmission line 7 is connected to two terminals 116 and 117. A path is completed from terminal 117 to terminal 116 through position 1 and wiper 5 of selector switch 101, lead 122, the winding of the signal magnet 123 of the reperforator 125 of the reperforator-distributor 10, lead 124, and wiper 5 and position 1 of selector switch 100. The reperforator-distributor 10 includes the reperforator 125 which translates the incoming signals and records them as corresponding holes in a paper tape 126. It also includes a sensing mechanism 127 which is operated by a sensing shaft, not shown, to translate the holes in the tape 126 to corresponding conditions in sensing contacts, not shown. The conditions in the sensing contacts of sensing mechanism 127 are fed via line 128 to the distributing contacts 129 of distributor 130. The distributor 130 will be operated to retransmit the signals received at the reperforator 125 in a manner determined by the setting of the selector control 16.

When transmitter group A is operated by the switching section A of the switching circuit of the transmitting control unit, the routing transmitter 1 of the transmitter group will be first operated to transmit the disconnect signal and the directing character combination "BM" over the line 7. The first character of the disconnect signal, "figure shift," will be perforated in tape 126 by the reperforator 125 and the tape 126 will be fed into the sensing contacts of the sensing mechanism 127. Tape stop contacts 131 in the sensing mechanism 127 will close indicating the reception of a character for retransmission. A path will be completed from ground to the positive terminal 156 of a source of potential through the winding of the release magnet 132 of sensing mechanism 127, closed contacts 131 and lead 133. The release magnet will be energized and the sensing shaft of the sensing mechanism 127 will rotate to bring the character, "figure shift," into the sensing contacts. During its rotation, the sensing shaft closes contacts 134 in the sensing mechanism 127. The closing of the contacts 134 completes a path from ground to the positive terminal 156 through the contacts 134, the winding of relay RA and lead 133. Relay RA will be energized. When the sensing shaft completes a single rotation, contacts 134 will open and relay RA will be inactivated. The character "figure shift" will now appear as a condition in the sensing contacts of the sensing mechanism 127. The sensing mechanism will operate to connect lead 135 to the positive terminal of a source of potential, not shown. A path will be completed from ground to the positive terminal through lead 136, break contacts CX1 of relay CX, break contacts AX1 of relay AX, the winding of relay RB and lead 135. Relay RB will be energized. When relay RB is energized, a path will be completed from the positive terminal 156 to ground through make contacts RB1 of relay RB, the winding of relay RC, lead 137 and lead 136, energizing relay RC. The sensing shaft will begin to make another rotation to bring the next character of the disconnect signal, "Z," into the sensing contacts of the sensing mechanism 127. During the rotation of the shaft, contacts 134 will again close causing the energization of relay RA. When relay RA is energized, a path will be completed from the positive terminal 156 to ground through make contacts RA1 of relay RA, make contacts RC2 of relay RC, the winding of relay RC, lead 137 and lead 136. The condition corresponding to the character "figure shift" in the sensing contacts will be fed over lead 128 to the distributing contacts 129 of distributor 130. The positive terminal, supplied by the sensing mechanism 127, will be disconnected from lead 135 and relay RB will be inactivated. Upon the inactivation of relay RB, make contacts RB1 of relay RB will open. However, relay RC will remain energized due to the prior establishment of a holding circuit by the energization of relay RA and the closure of make contacts RA1. When the sensing shaft completes the rotation, a condition corresponding to the character "Z" will be set up in the sensing contacts. The sensing mechanism 127 will operate to connect lead 138 to a positive terminal, not shown, completing a path from the positive terminal to ground through lead 138, make contacts RC9 of relay RC, the winding of relay Z, break contacts FX1 of relay FX, and lead 136. Relay Z will be energized and make contacts Z1 of relay Z in the holding circuit of relay RC will close. When the sensing shaft of sensing mechanism 127 completes its rotation, contacts 134 will open inactivating relay RA. Make contacts RA1 will open, but relay RC will remain energized through the holding circuit established by the operation of relay Z and the closing of make contacts Z1. Therefore, relays Z and RC will now be the only relays energized.

When relay Z is energized, a path will be completed from the positive terminal 156 to ground through lead 157, the winding of relay AX, lead 138, contact 2 and armature 1 of transfer contacts BX1 of relay BX, contact 2 and armature 1 of transfer contacts DX2 of relay DX, make contacts Z2 of relay Z, make contacts RC3 of relay RC, contact 3 and armature 1 of transfer contacts FX2 of relay FX, contact 3 and armature 1 of transfer contacts HX2 of relay HX, contact 2 and armature 1 of transfer contacts KX1 of relay KX, break contacts RA2 of relay RA, and lead 139. Relay AX will be energized and a path will be completed from the positive terminal 156 to ground through lead 157, the winding of relay AX, the winding of relay BX, make contacts AX2 of relay AX, break contacts DX1 of relay DX, make contacts RC4 of relay RC, lead 140, and lead 139. Relay BX will not be energized, however, because a ground connection is made at both ends of the winding of the relay.

In the meantime, the sensing shaft of the sensing mechanism 127 starts a new rotation to bring the next character of the disconnect signal of the routing information into the sensing contacts. Contacts 134 will be closed and relay RA will be energized. The energization of relay RA opens break contacts RA2 of relay RA, and the ground connection to the mid-point between the windings of relays AX and BX is disconnected. Relay BX will be energized. The receipt of the first character "Z," the second character of the disconnect signal, is, therefore, registered by the operation of relay BX.

The next character of the disconnect signal is also the character "Z." The sensing shaft of sensing mechanism 127 will complete its rotation and a condition corresponding to the character "Z" will be established in the sensing contacts of the sensing mechanism 127. Relays Z and RC will remain energized. Contacts 134 will open and relay RA will be inactivated. A path will be completed from the positive terminal 156 to ground through lead 157, the winding of relay CX, lead 141, contact 3 and armature 1 of transfer contacts BX1 of relay BX, contact 2 and armature 1 of transfer contacts DX2 of relay DX, make contacts Z2 of relay Z, make contacts RC3 of relay RC, contact 3 and armature 1 of transfer contacts FX2 of relay FX, contact 3 and armature 1 of transfer contacts HX2 of relay HX, contact 2 and armature 1 of transfer contacts KX1 of relay KX, break contacts RA2 of relay RA and lead 139. Relay CX will be energized and a path will be completed from the positive terminal 156 to ground through lead 157, the winding of relay CX, the winding of relay DX, make contacts CX2 of relay CX, break contacts FX3 of relay FX, make contacts RC4 of relay RC, lead 140 and lead 139. As in the case of relay BX, relay DX will not be energized due to the ground connection to both ends of the winding of the relay. The sensing shaft of the sensing mechanism 127 will then start a new rotation to bring the next character of the disconnect signal into the sensing contacts. Contacts 134 are closed and relay RA is energized. Break contacts RA2 of relay RA open, disconnecting the ground connection from the mid-point between the windings of relays CX and DX and relay DX will be energized. Upon the energization of relay DX, break contacts DX1 of relay DX will open, disconnecting the ground connection to the windings of relays AB and BX. Relays AB and BX will be inactivated. The receipt of the second character "Z," the third character of the disconnect signal, is registered by the operation of relay DX.

Contacts 134 will open when the sensing shaft completes its rotation and relay RA will be inactivated. A condition corresponding to the fourth character of the disconnect signal, character "Z," will be established in the sensing contacts of sensing mechanism 127. Relays Z and RC will remain activated. A path will be completed from the positive terminal 156 to ground through lead 157, the winding of relay EX, lead 142, contact 3 and armature 1 of transfer contacts DX2 of relay DX, make contacts Z2 of relay Z, make contacts RC3 of relay RC, contact 3 and armature 1 of transfer contacts FX2 of relay FX, contact 3 and armature 1 of transfer contacts HX2 of relay HX, contact 2 and armature 1 of transfer contacts KX1 of relay KX, break contacts RA2 of relay RA and lead 139. Relay EX will be energized and a path will be completed from the positive terminal 156 to ground through lead 157, the windings of relays EX and FX, make contacts EX1 of relay EX, break contacts HX3 of relay HX, make contacts RC4 of relay RC, lead 140 and lead 139. As in the case of relays BX and DX, relay FX will not be energized due to the ground connection at both ends of the winding of the relay.

The sensing shaft will in the meanwhile start a new rotation to bring the next character of the disconnect signal into the sensing contacts. As the shaft rotates, contacts 134 will close and relay RA will be energized. Break contacts RA2 of relay RA will open and the ground connection will be disconnected from the mid-point between the windings of relays EX and FX. Relay FX will be energized, registering the receipt of the fourth character of the disconnect signal, character "Z." Break contacts FX3 of relay FX will open, disconnecting the ground connection to the windings of relays CX and DX and the two relays will be inactivated. The next and last character of the disconnect signal will be the character "figure shift." The sensing mechanism 127 will again operate to connect the positive terminal of a source of potential, not shown, to lead 135 and a path will be completed from the positive terminal to ground through lead 135, the winding of relay RB, break contacts AX1 of relay AX, break contacts CX1 of relay CX and lead 136. Relay RB will be energized closing make contacts RB1 of the relay. Relay RC will remain energized through the make contacts RB1 of relay RB. The sensing mechanism will disconnect the positive terminal supplied by the sensing mechanism to lead 138 and relay Z will be inactivated.

It should be remembered at this point that when relay RA operates, make contacts RA1 of relay RA in the holding circuit of relay RC will close. During the period that the condition in the sensing contacts is being changed by the rotation of the sensing shaft of the sensing mechanism 127, relay RA is energized and the make contacts RA1 will be closed. A continuous holding circuit is provided for the relay RC and as long as the proper sequence of characters is received, relay RC will remain energized.

When the sensing shaft completes its rotation, contacts 134 open and relay RA is inactivated. Relays RB and RC will be energized. A path will be completed from the positive terminal 156 to ground through lead 157, the winding of relay GX, lead 143, make contacts RB2 of relay RB, contact 2 and armature 1 of transfer contacts FX2 of relay FX, contact 3 and armature 1 of transfer contacts HX2 of relay HX, contact 2 and armature 1 of transfer contacts KX1 of relay KX, break contacts RA2 of relay RA and lead 139. Relay GX will be energized and a path will be completed from the positive terminal 156 to ground through lead 157, the windings of relays GX and HX, make contacts GX1 of relay GX, break contacts RX1 of relay RX and lead 139. A ground connection will be connected to both ends of the winding of relay HX and relay HX will not, therefore, be energized. The energization of the relay GX indicates that the character "figure shift" has been received and that the complete disconnect signal has been received correctly.

Upon the receipt of the three characters "Z, Z and Z," in the upper case followed by a "figure shift" character, relay GX is energized. The sensing shaft of the sensing mechanism 127 will start to rotate to bring the next character of the routing information, the first character of the directing character combination, character "B," into the sensing contacts. Contacts 134 will close and relay RA will be energized. When relay RA is energized, make contacts RA2 of relay RA will open disconnecting the ground connection to the mid-point between the windings of relays GX and HX and relay HX will be energized. Break contacts HX3 of relay HX will open disconnecting the ground connection to the windings of relays EX and FX and the two relays will be inactivated. The sensing shaft will complete its rotation and a new condition corresponding to the character "B" will be established in the sensing contacts, the directing character combination "BM" being used to identify the messages transmitted by transmitter group A. Contacts 134 will open and relay RA will be inactivated. A path will be completed from the positive terminal 156 to ground through lead 157, the winding of relay JX, lead 144, contact 2 and armature 1 of transfer contacts HX2 of relay HX, contact 2 and armature 1 of transfer contacts KX1 of relay KX, break contacts RA2 of relay RA and lead 139, energizing relay JX. The sensing mechanism 127 will operate to connect the positive terminal of a source of potential, not shown, to lead 145, completing a path from the positive terminal to ground through lead 145, make contact RC8 of relay RC, the winding of relay B, make contacts JX1 of relay JX and make contacts HX1 of relay HX and lead 136. Relay B will be energized. The sensing mechanism 127 will disconnect the positive terminal supplied by the sensing mechanism 127 to lead 135 and relay RB will be inactivated. When relay B is energized, make contacts B1 of relay B in the holding circuit of relay RC will close and relay RC will continue to be energized even though make contacts RB1 open on the inactivation of relay RB. The make contacts RA1 of relay RA will be closed during the period that contacts B1 of relay B are closing and make contacts RB1 of relay RB are opening to maintain a continuous holding circuit for the relay RC. A path is completed upon the operation of relay B from the positive terminal 156 to ground through lead 157, the winding of relay NX, lead 146, position 1 and wiper 5 of selector switch 110, make contacts B2 of relay B, contact 2 and armature 1 of transfer contacts HX2 of relay HX, contact 2 and armature 1 of transfer contacts KX1 of relay KX, break contacts RA2 of relay RA and lead 139. The energization of relay NX will complete a path from the positive terminal 156 to ground through the windings of relays NX and OX, make contacts NX1 of relay NX, break contacts SX1 of relay SX, break contacts UX1 of relay UX, break contacts WX1 of relay WX, break contacts ZX1 of relay ZX, lead 147 and lead 139. However, relay OX will not be energized because the winding of the relay will be connected to ground at both ends.

When relay JX is energized, a path is completed from the positive terminal 156 to ground through lead 157, the windings of relays JX and KX, make contacts JX2 of relay JX, break contacts SX1 of relay SX, break contacts UX1 of relay UX, break contacts WX1 of relay WX, break contacts ZX1 of relay ZX, lead 147 and lead 139. Relay KX will not be energized, however, because a ground connection is made to both ends of the winding of the relay. The sensing shaft will again start to rotate to bring the next and last character of the directing character combination into the sensing contacts of sensing mechanism 127. As the shaft rotates, contacts 134 will close and relay RA will be energized. Upon the energization of relay RA, break contacts RA2 of the relay will open, disconnecting the ground connection from the mid-point between the windings of relay JX and KX and from the mid-point between the windings of relays NX and OX. Relays KX and OX will be energized. The sensing shaft will, thereafter, complete its rotation and the contacts 134 will open, inactivating relay RA. Break contacts RA2 of relay RA will close and a path will be completed from the positive terminal 156 to ground through lead 157, the winding of relay RX, make contacts KX2 of relay KX, lead 148, contact 3 and armature 1 of transfer contacts KX1 of relay KX, break contacts RA2 of relay RA and lead 139. Relay RX will be energized and the opening of break contacts RX1 of the relay will disconnect the ground connection to the windings of relays GX and HX, inactivating the two relays. The condition corresponding to the last character of the directing character combination received by the sensing mechanism 127 will be established in the sensing contacts. The character "M" is the next character and the sensing mechanism 127 will operate to connect the positive terminal of a source of potential, not shown, to lead 149, completing a path from the positive terminal to ground through lead 149, make contact RC6 of relay RC, the winding of relay M, make contacts JX1 of relay JX (the make contacts HX1 of relay HX having been opened by the inactivation of relay HX) and lead 136. Upon the energization of relay M, make contacts M1 of relay M in the holding circuit of relay RC will close and relay RC will remain energized. It will be remembered that the sequence of operation of the holding circuit of relay RC is such that make contacts RA1 of relay RA will be closed to maintain relay RC energized during the period in which make contacts B1 of relay B open and make contacts M1 of relay M close, the sensing mechanism having disconnected the positive terminal supplied by the sensing mechanism 127 from the lead 145, inactivating relay B.

When relay M is energized, a path will be completed from the positive terminal 156 to ground through lead 157, the winding of relay VX, position 1 and wiper 5 of selector switch 112, make contacts M2 of relay M, make contacts OX1 of relay OX, lead 148, contact 3 and armature 1 of transfer contacts KX1 of relay KX, break contacts RA2 of relay RA and lead 139. Relay VX will be energized and complete a path from the positive terminal 156 through lead 157, the windings of relays VX and WX, contact 2 and armature 1 of transfer contacts VX1 of relay VX, contact 3 and armature 1 of transfer contacts YX1 of relay YX, break contacts GX2 of relay GX, position 1 and wiper 5 of selector switch 114, lead 150, lead 147 and lead 139. Inasmuch as a ground connection is connected to both ends of relay WX, relay WX is not energized. The sensing shaft will now be rotated to bring the next character, "letters shift," of the routing information into the sensing contacts of the sensing mechanism 127. As the shaft rotates, contacts 134 will close and relay RA will be energized. Break contacts RA2 of relay RA will open, disconnecting the ground connection to the mid-point between the windings of relays VX and WX. Relay WX will be energized and break contacts WX1 of relay WX will open. When break contacts WX1 of relay WX open, the ground connection to the windings of relays NX and OX will be disconnected and the two relays will be inactivated. The ground connection to the windings of relays JX and KX will also be disconnected and these two relays will also be inactivated. The opening of break contacts RA2 of relay RA also disconnects the ground connection to relay RX and relay RX will be inactivated.

The sensing shaft will complete its rotation and contacts 134 will open, inactivating relay RA. A condition corresponding to the character "letters shift" will be established in the sensing contacts of the sensing mechanism 127. The sensing mechanism will operate to disconnect the positive terminal of the source of potential supplied by the sensing mechanism 127 to lead 149 and relay M will be inactivated. Upon the inactivation of relay M, make contacts M1 of relay M in the holding circuit of relay RC will open. When the sensing shaft completes its rotation, the contacts 134 will open and relay RA will be inactivated. Make contacts RA1 in the holding circuit of relay RC will open. No other contacts will be closed in the holding circuit of relay RC and the relay will be inactivated. Only relays VX and WX will now be energized.

To review the discussion up to this point, it becomes apparent that the relays AX through ZX comprise a counting circuit. The relays are arranged vertically in pairs and are identified, for purposes of description, by the suffix letter X. Counting from the top, the first four pairs of relays, relays AX through HX, constitute the counters for the disconnect signal included in the routing information transmitted by transmitter group A. The second four pairs of relays, relays JX through QX, constitute the counters for the first directing character of the connect signal and the third four pairs of relays constitute the counters for the second directing character of the connect signal. The operation of all of the relays is controlled by the operation of relay RA which is energized each time that a change of the condition in the sensing contacts of sensing mechanism 127 takes place.

Relay GX will be energized only when the correct disconnect signal has been received. Make contacts HX1 of relay HX and make contacts JX1 of relay JX will remain open during the period the disconnect signal is being received and, therefore, relays C, P, M, J, and B cannot be energized if the characters C, P, M, J, or B should be received during this period. Make contacts AX1 of relay AX and make contacts CX1 of relay CX in the operating circuit of relay RB will prevent relay RB from operating if the character "figure shift" should be received during the period assigned to the receipt of a character "Z," relays AX and CX being energized only when the three characters "Z" of the disconnect signal are received. When the final character "figure shift" of the disconnect signal is received, relay FX will be energized. Break contacts FX1 of relay FX will be open and, thereby, prevent the operation of relay Z if a fourth character "Z" should be received instead of the character "figure shift." Only the sequence of characters "figure shift, Z, Z, Z, figure shift" will operate the counting circuit. If any other characters or sequence of characters should be received, relay RC will not be energized or, if energized, will not remain energized to permit the continued operation of the circuit. Following the reception of the correct disconnect signal, the counting circuit will register the reception of the directing character combination or connect signal. If other characters or an incorrect sequence of characters should be received during the period assigned to the receipt of the disconnect signal, the counting circuit will be inactivated by contacts RC3 and RC4 of relay RC, which open the circuits of relays AX to HX inclusive.

Figure 6:
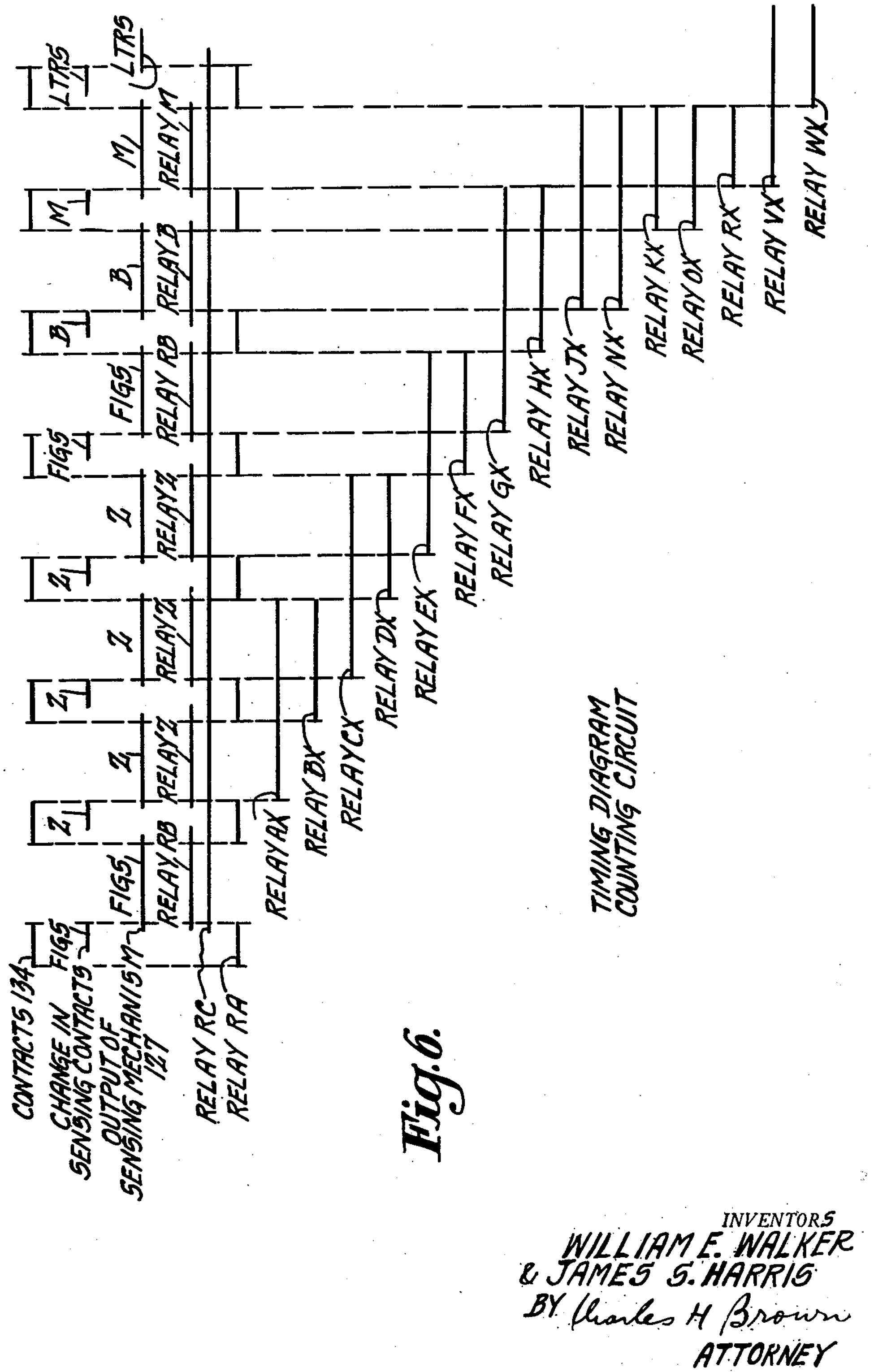
Fig. 6 is a timing diagram given in explanation of the sequence of operation of the counting circuit located at the receiving terminal station.

The sequence of operation of the counting circuit will be more clearly understood by an examination of Fig. 6. As shown in the timing diagram, the sequence is as follows: contacts 134 close, relay RA is energized, relays RB and RC are energized; contacts 134 open, relay RA is inactivated; contacts 134 close, relay RA is energized, relay RB is inactivated, relay Z is energized; contacts 134 open, relay RA is inactivated, relay AX is energized; contacts 134 close, relay RA is energized, relay Z is inactivated, relay Z is energized, relay BX is energized; contacts 134 open, relay RA is inactivated, relay CX is energized; contacts 134 close, relay RA is energized, relay Z is inactivated, relay Z is energized, relay DX is energized, relays AX and BX are inactivated; contacts 134 open, relay RA is inactivated, relay EX is energized; contacts 134 close, relay RA is energized, relay Z is inactivated, relay RB is energized, relay FX is energized, relays CX and DX are inactivated; contacts 134 open, relay RA is inactivated, relay GX is energized; contacts 134 close, relay RA is energized, relay RB is inactivated, relay B is energized, relay HX is energized, relays EX and FX are inactivated; contacts 134 open, relay RA is inactivated, relay JX is energized, relay NX is energized; contacts 134 close, relay RA is energized, relay B is inactivated, relay M is energized, relay KX is energized, relay OX is energized; contacts 134 open, relay RA is inactivated, relay RX is energized, relays GX and HX are inactivated, relay VX is energized; contacts 134 close, relay RA is energized, relay M is inactivated, relay WX is energized, relays JX and KX are inactivated, relays NX, OX and RX are inactivated; contacts 134 open, relays RA and RC are inactivated. Relays VX and WX will remain energized.

Assuming that the condition of the relay contacts are as shown in Fig. 4*b* and not as described in the preceding paragraph, each rotation of the sensing shaft of the sensing mechanism 127 will cause contacts 134 to close and relay RA to be energized. Upon the completion of each rotation of the shaft a condition will be established in the sensing contacts of the mechanism 127 corresponding to the character received. This condition is fed in the form of electrical pulses over lead 128 to the distributing contacts 129 of the distributor 130. When relay RA is energized, a path will be completed from a positive terminal 158 of a source of potential to ground through break contacts GX4 of relay GX, make contacts RA3 of relay RA and the winding of the release magnet 151 of the distributor 130. The winding of the release magnet will be energized and the character appearing in the distributing contacts 129 will be fed to a receiving device. A path is completed from ground to the positive terminal 158 through the distributing contacts 129, contact 2 and armature 1 of transfer contacts TX2 of relay TX, contact 2 and armature 1 of transfer contacts VX2 of relay VX, contact 2 and armature 1 of transfer contacts YX2 of relay YX, position 1 and wiper 5 of selector switch 103, receiving device 14, wiper 5 and position 1 of selector switch 102 and lead 153. The characters sequentially appearing in the distributing contacts 129 will, therefore, be fed to the receiving device 14. The characters will be sequentially fed to the receiving device upon the operation of the release magnet 151 of distributor 130, the winding of which is energized by the operation of relay RA closing make contacts RA3 of the relay each time the sensing shaft of the sensing mechanism 127 makes a rotation. It is to be noted that when no characters are available for retransmission by the distributing contacts 129, a steady potential signal will be fed to receiving device 14 inasmuch as a path will be completed from the positive terminal 158 to ground through the distributing contacts 129 and the receiving device 14. The receiving device 14 will be maintained at standby condition in the absence of message signals.

Located immediately below receiving device 14 in Fig. 4*b* are three other receiving devices 12, 13 and 15. The receiving devices 12, 13, 14 and 15 may be any suitable device for recording the signals fed thereto. They may be telegraph printers or they may be reperforators which translate the signals received into holes punched in a tape. The type of device used will depend on the equipment available and/or the type needed in a particular application. As in the case of receiving device 14, receiving devices 12, 13 and 15 will be held on standby condition. A path is completed from ground to the positive terminal 158 through break contacts UX2 of relay UX, lead 152, position 1 and wiper 5 of selector switch 105, receiving device 15, position 1 and wiper 5 of selector switch 104 and lead 153. A further path is completed from ground to the positive terminal 158 through lead 154, break contacts WX2 of relay WX, position 1 and wiper 5 of selector switch 107, receiving device 12, wiper 5 and position 1 of selector switch 106 and lead 153. A still further path is completed from ground to the positive terminal 158 through lead 154, break contacts ZX2 of relay ZX, position 1 and wiper 5 of selector switch 109, receiving device 13, wiper 5 and position 1 of selector switch 108 and lead 153. A steady potential signal will, therefore, be fed to the respective receiving devices 12, 13 and 15, maintaining them on standby condition.

The disconnect signal will be received by the reperforator 125 and retransmitted to the receiving device 14 by the distributor 130. Upon the receipt of the fifth character "figure shift" of the disconnect signal, relay GX will be energized registering the reception of the correct disconnect signal. Break contacts GX4 of relay GX will open. The subsequent energization of relay RA and, therefore, the closing of make contacts RA3 of relay RA cannot energize the winding of the release magnet 151 of distributor 130 due to the break in the operating path of the release magnet. The directing characters will be available in the distributing contacts 129 for retransmission at this time. As the distributor 130 is not operated, retransmission of these characters to receiving device 14 will not take place. As outlined above, the operation of the counting circuit in response to the directing characters is such that, assuming that the directing characters "BM" are being received, relays VX and WX are energized. Relay GX will be inactivated at the same time that relay VX is energized and break contacts GX4 of relay GX will close. When relay VX is energized, a path will be completed from ground to the positive terminal 158 through distributing contacts 129, lead 155, make contacts VX3 of relay VX, position 1 and wiper 5 of selector switch 107, receiving device 12, wiper 5 and position 1 of selector switch 106 and lead 153. When relay WX is energized, thereafter, as shown in the timing diagram of Fig. 6, break contacts WX1 of relay WX will open disconnecting the ground connection to device 12 via lead 154 and the receiving device 12 will be connected to ground through the distributing contacts 129 of distributor 130. The routing information will have been completely received. The message, as transmitted by one of the message transmitters of transmitter group A, will be fed through the reperforator-distributor 10 and retransmitted over lead 155 to receiving device 12.

Upon the operation of relay VX, armature 1 of transfer contacts VX2 will disengage contact 2 and engage contact 3 of the transfer contacts. The continuity of the path between the distributing contacts 129 and receiving device 14 will be broken and the receiving device 14 will be disconnected from the distributing contacts. Therefore, the receiving director unit will have completed one full sequence of operation. The message transmitted by transmitter group A over transmission line 7 will be terminated in receiving device 12.

It may now be assumed that upon the completion of the message transmitted by transmitter group A, transmitter group B will transmit a message over the line 7. The disconnect signal included in the routing information, which will be received first, will bring about the operation of the counting circuit. Relay GX will be energized indicating the reception of the correct disconnect signal. Up to this point, receiving device 12 remained operatively connected to the distributing contacts 129 and, therefore, the disconnect signal is retransmitted to that receiving device by the distributor 130. However, when relay GX is energized, break contacts GX2 of relay GX in the operating circuit of relays VX and WX open and disconnect the ground connection to the windings of the relays. Relays VX and WX will be inactivated. Make contacts VX3 of relay VX will open and break contacts WX2 of relay WX will close, disconnecting the receiving device 12 from the distributing contacts 129 and re-establishing the steady potential signal by the closing of break contacts WX2 to maintain the receiving device on standby condition. Transfer contacts VX2 of relay VX will be released and a path will again be completed from the distributing contacts 129 of distributor 130 to the receiving device 14 through contact 2 and armature 1 of the transfer contacts. It will be remembered that when relay GX is energized, break contacts GX4 will open rendering distributor 130 inoperative. The directing characters available for retransmission during this period will not, therefore, be fed to receiving device 14.

The directing characters received following the disconnect signal included in the routing information transmitted by the transmitter group B will be the character combination "CP." The sequence of operation of the counting circuit will be exactly the same as previously outlined except that relays C and P will be energized instead of relays B and M. When relay C is energized, instead of relays NX and OX being energized as occurred when relay B was energized, relays PX and QX will be energized. When relay P is energized, instead of relays VX and WX being energized, as occurred when relay M was energized, relays YX and ZX will be energized. The remaining relays in the counting circuit will be operated in exactly the same manner as outlined above. Relays YX and ZX will remain energized when the counting circuit has completed the full sequence of operation. When relay YX operates, make contacts YX3 of relay YX will close and a path will be completed from ground to the positive terminal 158 through distributing contacts 129, lead 155, make contacts YX3 of relay YX, position 1 and wiper 5 of selector switch 109, receiving device 13, wiper 5 and position 1 of selector switch 108 and lead 153. A steady potential signal will continue to be fed to the receiving device 13 due to the ground connection to the receiving device 13 through break contacts ZX2 of relay ZX and lead 154. However, when relay ZX operates, following the operation of relay YX, break contacts ZX2 will open and receiving device 13 will be connected to ground through lead 155 and the distributing contacts 129. At the same time that relay YX is energized, relay GX will be inactivated. Break contacts GX4 of relay GX will close and the distributor 130 will, thereafter, be operated to retransmit the message received by the reperforator-distributor 10 over lead 155 to receiving device 13. When relay YX operates, armature 1 of transfer contacts YX2 will disengage contact 2 and engage contact 3 of the transfer contacts breaking the continuity of the path between the distributing contacts 129 and receiving device 14, preventing the retransmission of the message to receiving device 14. The receiving director unit will have completed a full sequence of operation and the message transmitted by one of the message transmitters of transmitter group B will be terminated in receiving device 13.

It will now be assumed that upon the completion of the message transmitted by transmitter group B, transmitter group C will forward a message over line 7. The routing information will be transmitted first and will be received by the reperforator-distributor 10. Relay GX will operate registering the reception of the correct disconnect signal and break contacts GX2 of the relay will open disconnecting the ground connection to the windings of relays YX and ZX, inactivating the two relays. When relay YX is inactivated, make contacts YX3 of relay YX will open. Receiving device 13 will be disconnected from the distributing contacts 129 and the closing of break contacts ZX2 by the inactivation of relay ZX will cause the steady potential signal to be fed to the receiving device 13. The device 13 will be connected to ground through the break contacts ZX2 and lead 154 and the receiving device 13 will be held in standby condition. Transfer contacts YX2 of relay YX will be released and a path will be completed from the distributing contacts 129 through contact 2 and armature 1 of the transfer contacts to receiving device 14. However, as pointed out above, distributor 130 will be rendered inoperative by the opening of break contacts GX4 of relay GX when relay GX is energized and signals will not be forwarded from the distributing contacts 129 to receiving device 14 during this period.

Following the disconnect signal, the routing transmitter of transmitter group C will transmit the directing characters "JJ." Relay J of the counting circuit will be energized and relay RC will be held energized by the closing of make contacts J1 of relay J in the holding circuit of relay RC. Relays JX, KX, and RX will be energized in the same manner as previously described. When relay RX is energized, a path will be completed from the positive terminal 156 to ground through the windings of relays RX and SX, make contacts RX2 of relay RX, contact 3 and armature 1 of transfer contacts TX1, contact 3 and armature 1 of transfer contacts VX1, contact 3 and armature 1 of transfer contacts YX1, break contacts GX2 of relay GX, position 1 and wiper 5 of selector switch 114, lead 150, lead 147 and lead 139. Relay SX will be energized and the break contacts SX1 of relay SX will open disconnecting the ground connection to the windings of relays JX and KX. Relays JX and KX will be inactivated. Relays RX and SX will be the only relays remaining energized.

The energization of relay RX causes break contacts

RX1 of the relay to open disconnecting the ground connection to the windings of relays GX and HX and the relays GX and HX will be inactivated. When relay GX is inactivated, break contacts GX4 of relay GX will close and the subsequent operation of relay RA by the rotation of the sensing shaft of sensing mechanism 127 and, therefore, the closing of make contacts RA3 of relay RA will cause the distributor 130 to operate each time the make contacts RA3 of relay RA close. The message transmitted by one of the message transmitters of transmitter group C over transmission line 7 will be fed to the distributing contacts 129 of distributor 130 and the message will be fed from the distributing contacts 129 over lead 155 to the receiving device 14.

To review the operation of the receiving director unit, when transmitter groups A, B and C are operated by the transmitting control unit at the transmitting station, as shown in Figs. 2*a*, 2*b*, 2*c* and 2*d*, to sequentially transmit messages over transmission line 7, the receiving director unit, shown in Figs. 4*a* and 4*b*, will operate to distribute the messages among a number of receiving devices in accordance with the routing information preceding each message transmitted. The routing information transmitted by transmitter group A will include the disconnect signal and the directing character combination "BM." The routing information transmitted by transmitter group B will include the disconnect signal and the directing character combination "CP" and the routing information of transmitter group C will include the disconnect signal and the directing character combination "JJ." The wiper 5 of the selector control 16 included in the receiving director unit will be set on position 1 corresponding to the setting of the selector control of the transmitting control unit at the transmitting station. The counting circuit of the receiving director unit will operate in response to the routing information transmitted by transmitter group A to terminate the message transmitted by the transmitters of the group in receiving device 12. The relays of the counting circuit will operate in a predetermined sequence, as determined by the directing character combination "BM," to energize relays VX and WX. The energization of these relays operates to connect the receiving device 12 to the reperforator-distributor 10 and the message transmitted by transmitter group A will be fed to that receiving device. When a message from transmitter group B is received, the relays of the counting circuit of the receiving director unit will operate in response to the directing character combination "CP" to energize relays YX and ZX. The energization of these relays operates to connect the receiving device 13 to the reperforator-distributor 10 and the message transmitted by transmitter group B will be fed to that receiving device. The relays of the counting circuit of the receiving director unit will operate in response to the directing character combination "JJ" when transmitter group C is operated to transmit a message over line 7 to energize relays RX and SX. The energization of these relays operates to connect the receiving device 14 to the reperforator-distributor 10 and the message transmitted by transmitter group C will be fed to that receiving device.

It has been assumed that the respective transmitter groups will operate in the order A, B, C. This need not be the case, however. The counting circuit completes a full sequence of operation in response to the routing information preceding each message. The transmitter groups may be operated over line 7 in any order desired and, in fact, a single one of the groups could be operated repetitiously. The counting circuit treats each message independently and will operate to feed each message to the proper receiving device in accordance with the routing information preceding the message.

Up to this point, the discussion has been directed to the operation of the receiving director unit when all three transmitter groups A, B and C are being operated to sequentially transmit messages over the line 7. An operator may now wish to operate the transmitting groups on position 2 of the selector control 6 of the transmitting control unit, as shown in Figs. 2*a*, 2*b*, 2*c* and 2*d*. Transmitter group A will be operated to transmit messages over transmission line 8. Transmitter groups B and C will be operated to transmit messages sequentially over transmission line 7. As shown in Fig. 4*b*, transmission line 8 is terminated at terminals 118 and 119. Selector control 16 of the receiving director unit will be set on position 2 to correspond to the setting of the selector control 6 of the transmitting control unit. Terminal 118 will be connected to terminal 119 via lead 159, position 2 and wiper 5 of selector control 106, receiving device 12, wiper 5 and position 2 of selector control 107 and lead 160. Transmission line 8 is, therefore, effectively connected directly to receiving device 12. Messages transmitted by the message transmitters of transmitter group A over transmission line 8 will be fed directly to receiving device 12.

As was explained in connection with the transmitting control unit, the direct connection to the receiving device 12 eliminates the need for routing information and the routing transmitter of group A will not be operated. The messages transmitted over line 7 by transmitter groups B and C will be fed to the reperforator-distributor 10 via positions 2 and wipers 5 of the selector switches 100 and 101. As position 2 of each of the two switches is connected to position 1 of the respective switches, the messages will be fed through the switches to the reperforator-distributor 10 in the manner already described. The counting circuit of the receiving director unit will operate in response to the routing information preceding each message to distribute the messages to the proper receiving devices. The messages transmitted by transmitter group B will be fed to receiving device 13 and the messages transmitted by transmitter group C will be fed to receiving device 14. The counting circuit will operate in the same manner as already described. Instead of the time of transmission overline 7 being occupied by three message channels, it will be occupied by two.

Instead of transmitter group A, it may be desirable to have transmitter group B solely transmit messages over the transmission line 8. The selector control of the transmitting control unit will be set on position 3, as will the selector control 16 of the receiving director unit. Transmission line 8 will remain connected to the terminals 118 and 119. However, terminal 118 will now be connected to terminal 119 via lead 159, lead 161, position 3 and wiper 5 of selector switch 108, receiving device 13, wiper 5 and position 3 of selector switch 109, lead 162 and lead 160. The transmission line 8 will now be effectively connected directly to the receiving device 13 and the transmitter group B will operate to transmit messages over line 8 to that receiving device. As a direct connection is made between the transmitter group B and receiving device 13, routing information is not necessary and, as was pointed out in connection with the transmitting control unit, shown in Figs. 2*a*, 2*b*, 2*c* and 2*d*, the routing transmitter of transmitter group B will not be operated. The messages transmitted over transmission line 7 by transmitter groups A and C will be fed through positions 3 and wipers 5 of the selector switches 100 and 101 to the reperforator-distributor 10. Positions 3 of the two switches are connected to positions 1 and 2 of the switches so that the messages will be fed through the selector switches 100 and 101 to the reperforator-distributor 10 in the manner already described. The counting circuit of the receiving director unit will operate in response to the routing information preceding each message transmitted over line 7 to distribute the messages to the proper receiving device. The operation of the relays of the counting circuit will be the same as previously described and the messages transmitted by transmitter group A will be fed to receiving device 12, the messages transmitted by transmitter group C being fed to receiving device 14.

If all three transmission lines 7, 8 and 9 should become available for use and the use of all three lines should be desired, the selector control of the transmitting control unit will be set on position 4, transmitter group A will be operated to transmit messages over line 8, transmitter group B to transmit messages over line 9 and transmitter group C to transmit messages over line 7. Transmission line 7 remains connected to terminals 116 and 117 of the receiving director unit, as shown in Fig. 4*b*. Terminal 116 will be connected to terminal 117 via lead 163, position 2 of terminal board 164, tie lead 165, position 3 of terminal board 164, lead 166, position 4 and wiper 5 of selector switch 103, receiving device 14, wiper 5 and position 4 of selector switch 102, lead 167, position 3 of terminal board 168, tie lead 169, position 2 of terminal board 168 and lead 170. Transmission line 7 will be effectively connected directly to receiving device 14. The messages transmitted over line 7 by transmitter group C will, therefore, be terminated in receiving device 14. Transmission line 8 will also remain connected to terminals 118 and 119. Terminal 118 will be connected to terminal 119 via lead 159, position 4 and wiper 5 of selector switch 106, receiving device 12, wiper 5 and position 4 of selector switch 107 and lead 160. Transmission line 8 will be effectively connected directly to the receiving device 12. The messages transmitted over line 8 by transmitter group A will, therefore, be terminated in receiving device 12. Transmission line 9 is connected to terminals 120 and 121. Terminal 120 is connected to terminal 121 via lead 171, position 4 and wiper 5 of selector switch 108, receiving device 13, wiper 5 and position 4 of selector switch 109, and lead 172. Transmission line 9 will be effectively connected directly to the receiving device 13 and the messages transmitted over line 9 by transmitter group B will, therefore, be terminated in that receiving device. As the messages transmitted by the respective transmitter groups are fed directly to the respective receiving devices, there is no need for routing information. The transmitting control unit at the transmitting station will operate in such a manner that the routing transmitters of the respective transmitter groups will not be operated.

When the wiper 5 of the selector control 16 is set on position 4, the wipers 5 of selector switches 100 and 101 will also be set on the positions 4 of the respective switches. A path will be completed from ground to the positive terminal 158 through position 4 and wiper 5 of selector switch 101, lead 122, the winding of the signal magnet 123 of the reperforator 125, lead 124, wiper 5 and position 4 of selector switch 100, lead 173, and lead 153. A steady potential signal will be supplied to the winding of the signal magnet 123 of reperforator 125, energizing the signal magnet and the reperforator 125 will be maintained in standby condition.

As the wiper 5 of the selector control 16 is rotated from one position of the control to the next, the wiper 5 of selecting switches 100 through 114 will be rotated in a like manner. Reference has been made to selector switches 100 through 109 in connection with the termination of the transmission lines 7, 8 and 9 at the respective receiving devices. The selector switches 100 through 109 are arranged so that each of the four positions of the switches, each of the receiving devices will be connected to the circuit of the receiving director unit in the proper manner. Transmitter group A is always operatively connected to receiving device 12 and transmitter group B is always operatively connected to receiving device 13. When the receiving director unit is arranged in the manner shown in Figs. 4*a* and 4*b*, transmitter group C will always be operatively connected to receiving device 14. This is true whether the receiving devices are connected directly to the respective transmission lines or connected through the operation of the counting circuit of the receiving director unit to transmission line 7.

The selector switches 110 through 114 are arranged in the counting circuit of the receiving director unit. Selector switch 110 is connected in the operating path of relays NX and OX and selector switch 111 is connected in the operating path of relays PX and QX. Relays NX and OX will be energized when the directing character "B" is received and relays PX and QX will be energized when the directing character "C" is received. When neither of these characters is received, as, for example, when the director character "J" is received, both pairs of relays will remain inactivated. The selector switches 110 and 111 are arranged in the circuit to effectively remove the pairs of relays from the circuit when they are not scheduled to be energized, as determined by the setting of the wiper 5 of the selector control 16. By removing the relays from the circuit, only that pair of relays scheduled to be energized at the respective positions of the selector control may be operated. For example, if the director character "B" should be received when the director character "C" is scheduled by the setting of switches 110 and 111 on position 2, relays NX and OX, having been disconnected from the circuit by selector switch 110, cannot be energized and the counting circuit will cease operation indicating the reception of incorrect routing information. The selector switches 110 and 111, therefore, operate to prevent the accidental operation of the relays on the receipt of an incorrect first directing character from controlling the sequence of operation of the relays of the counting circuit.

The selector switch 112 is connected in the operating circuit of relays VX and WX and selector switch 113 is connected in the operating circuit of relays YX and ZX. Relays VX and WX will be energized when the directing character "M" is received and relays YX and ZX will be energized when the directing character "P" is received. When neither of these directing characters is received, both pairs of relays will remain inactivated. Selector switches 112 and 113 are arranged in the circuit to effectively remove these pairs of relays from the circuit when they are not scheduled to be energized, as determined by the setting of the wiper 5 of the selector control 16. For example, when the selector switches 112 and 113 are set on position 2, directing character "P" is scheduled for reception. Selector switch 112 is arranged to disconnect relays VX and WX from the circuit. If the directing character "M" should be received, the sequence of operation of the counting circuit will be broken, as relays VX and WX cannot be energized, and the counting circuit will indicate the reception of an incorrect directing character. The selector switches 112 and 113 will prevent the accidental energization of the relays on the receipt of an incorrect second directing character from controlling the sequence of operation of the relays of the counting circuit.

When selector control 16 is set on position 4, there will be no operation of the counting circuit, as the messages transmitted over the transmission lines will be fed directly to the receiving devices. Selector switch 114 is arranged in the circuit to effectively remove all of the relays of the third group of relays from the circuit. By so doing, the accidental energization of the relays of the group is prevented and the proper operation of the counting circuit is assured. The selector switches 110 through 114 are arranged in the counting circuit to insure that the receiving director unit will operate properly at each position of the selector control 16.

When the wiper 5 of the selector control 16 is set on positions 1, 2 or 3, the receipt of a message by the reperforator-distributor 10 will cause the counting circuit to operate to operatively connect the distributing contacts 129 of distributor 130 to one of the receiving devices. The connection between the receiving device and the distributing contacts 129 will be maintained until a second message is received at which time the counting circuit will operate to disconnect the receiving device and to reconnect the same device or another one of the receiving devices to the distributing contacts 129, in accordance with the routing information preceding the second message. This action is brought about by the disconnect signal included in the routing information transmitted by the routing transmitter included in each of the transmitter groups. If the disconnect signal has been received and is correct, relay GX is energized. The energization of relay GX causes break contacts GX2 of the relay to open disconnecting the ground connection to the windings of the pair of relays energized in the third group of relays of the counting circuit. It will be remembered that when the sequence of operation of the counting circuit is completed, one pair of the relays of the third group will remain energized. The receiving device operatively connected to the distributing contacts 129 will be determined by the pair of relays energized. Before relay GX is energized, the disconnect signal will be received and retransmitted to the receiving device operatively connected to the distributing contacts 129.

It will be assumed that receiving device 13 is operatively connected to distributing contacts 129 and that, therefore, relays YX and ZX of the counting circuit are energized. Make contacts YX3 of relay YX will be closed and break contacts ZX2 of relay ZX will be open. The receiving device 13 will be connected to ground through make contacts YX3 of relay YX, lead 155 and the distributing contacts 129 of distributor 130. The first four characters of the disconnect signal, "figure shift, Z, Z, Z," will be fed to the receiving device 13. Upon the receipt of the fifth character of the disconnect signal, "figure shift," relay GX will be energized. During the time interval in which relay GX is being energized, the character "figure shift" is present in the distributing contacts 129 of distributor 130 and is being retransmitted to receiving device 13. Upon the energization of relay GX, make contacts GX3 of relay GX will close. A path will be completed from the positive terminal 158 to ground through lead 153, the selector switch 108, receiving device 13, selector switch 109, make contacts GX3 of relay GX and lead 154. A steady potential signal will, therefore, be fed to the receiving device 13. This signal will be superimposed on the character "figure shift" being fed to the receiving device from the distributing contacts 129 of distributor 130 and, instead of the character "figure shift" being received, a steady potential signal or the character "letter shift" will be received. The receipt of the signal corresponding to the character "letter shift" will cause the receiving device to change from the upper case in which condition it was placed by the first character "figure shift" of the disconnect signal to the lower case condition. Make contacts GX2 will open, disconnecting the ground connection to the windings of relays YX and ZX and the relays will be inactivated. Make contacts YX3 of relay YX will open and break contacts ZX2 will close. The receiving device 13 will be disconnected from the distributing contacts 129 and will be grounded through the break contacts ZX2 of relay ZX so as to be held on standby condition. The relay GX will be inactivated upon the receipt of the correct directing character combination and the relays of the counting circuit will operate to connect the same or another receiving device to the distributing contacts 129. Make contacts GX3 of relay GX will open and the sequence of operation will be complete. The eighth character, "letters shift," of the routing information will be fed to the newly connected receiving device to insure that the device is cleared for operation and the message following the routing information will, thereafter, be fed to the receiving device. Make contacts GX5, GX6 and GX7 of relay GX which are connected in the operating circuits of receiving devices 14, 15 and 12, respectively, will be operated in the same manner as contacts GX3 in the operating circuit of receiving device 13. By using the contacts of relay GX in the manner described, the receiving devices will be left in the lower case, and held in standby condition by the steady potential signal fed thereto by the connection to the positive terminal 158.

During the operation of the telegraph system of the invention, when the system is operating to transmit messages from at least two of the transmitter groups sequentially over transmission line 7, the routing information preceding one or more of the messages may be garbled or distorted in such a manner that the counting circuit cannot operate to control the distribution of the messages to the intended destination. The correct routing information must be received by the reperforator-distributor 10 to bring about the proper operation of the counting circuit. It is possible that, due to some breakdown in the transmitting equipment, the routing transmitter of a particular transmitter group will not be operated and, therefore, the routing information will not be sent at all. Even though messages preceded by such inadequate routing information or none at all cannot be distributed to the intended receiving devices, some means must be provided to record the receipt of the messages at the receiving station. Once the messages are recorded, regular procedures may be followed to reroute them to the correct destination. As already pointed out, one of the receiving devices 12, 13 or 14 will be operatively connected to the distributing contacts 129 at all times. Therefore, when garbled routing information or none at all is received, the subsequent message will be fed by the distributing contacts 129 of distributor 130 to the receiving device connected thereto. As there is no reception of a correct disconnect signal to bring about the disconnection of the receiving device and no reception of a correct directing character combination to bring about the reconnection of the distributing contacts to the same or another receiving device, the message will be fed to the receiving device already operatively connected to the distributing contacts. The receipt of the message by the receiving device will be noted and procedures will be followed to reroute the message to the proper destination. Such a breakdown in the system will, however, rarely occur and adequate provision is made to handle the messages transmitted over transmission line 7 when it does.

It is possible that the routing information transmitted over transmission line 7 by one of the transmitter groups may include a correct disconnect signal but an incorrect directing character combination. In such a case, the relays of the counting circuit will operate in response to the disconnect signal to disconnect the receiving device operatively connected to the distributing contacts 129. However, because a correct directing character combination is not received, the relays of the counting circuit will not be operated to reconnect the distributing contacts 129 to the same or another receiving device. Upon the reception of the disconnect signal, relay GX will be energized and the opening of break contacts GX2 of the relay will inactivate the relays of the counting circuit which had previously been energized to bring about the connection of one of the receiving devices to the distributing contacts 129. A path will be completed from the positive terminal 158 to ground through lead 153, selector switch 102, receiving device 14, selector switch 103, armature 1 and contact 2 of transfer contacts YX2 of relay YX, contact 2 and armature 1 of transfer contacts VX2 of relay VX, armature 1 and contact 2 of transfer contacts TX2 of relay TX, lead 155 and distributing contacts 129 of distributor 130. Receiving device 14 will be operatively connected to the distributing contacts 129. In normal operation, the counting circuit would now operate in response to a directing character combination to reconnect one of the receiving devices to the distributing contacts. However, when an incorrect directing character combination is received by the reperforator-distributor 10, relays RX and SX will complete the operation through the counting circuit and receiving device 14 will remain operatively connected to the contacts 129. The message following the routing information will be fed from the distributor 130 to the receiving device 14 where it will be recorded. When the misrouting of the message is noted, it may be rerouted to the correct destination in accordance with procedures established to handle such situations.

Reference has already been made to the fact that the messages transmitted by transmitter group C over transmission line 7 will be fed to the receiving device 14. Therefore, receiving device 14 will record not only the messages transmitted by transmitter group C, but will also record the messages transmitted over line 7 by the transmitter groups A, B or C which include an incorrect directing character combination in the routing information. This result might prove unsatisfactory due to the fact that it will be necessary to sort the messages recorded by the receiving device 14 into the two types of messages. Receiving device 15 is provided to eliminate this problem.

Terminal board 164 is shown in Fig. 4*b* positioned between receiving devices 14 and 15. A second terminal board 168 is positioned between receiving devices 15 and 12. The tie lead 165 shown connecting positions 2 and 3 of terminal board 164 is removed. A tie lead, shown as dotted line 174, is positioned so as to connect positions 1 and 2 of terminal board 164 together, a second tie lead, shown as dotted line 175, is positioned so as to connect positions 3 and 4 of terminal board 164 together. Terminal board 168 is arranged in the same manner. Tie lead 169 is removed and a tie lead, shown as dotted line 176, is positioned to connect positions 1 and 2 of the board together. A second tie lead, shown as dotted line 177, is positioned to connect positions 3 and 4 of the board together.

It will be assumed that the selector control of the transmitting control unit is set on position 1 and that, therefore, selector control 16 of the receiving director unit is also set on position 1. However, the system would operate in the same manner if the respective selector controls were to be set on positions 2 or 3. Messages transmitted by transmitter group A and/or transmitter group B over the transmission line 7 will be distributed by the receiving director unit to the receiving devices 12 and 13, respectively. No change will occur in the operation of the receiving director unit and the messages will be distributed as before. However, the messages transmitted over transmission line 7 by transmitter group C will now be terminated in receiving device 15 rather than in receiving device 14. The routing information transmitted by the routing transmitter of transmitter group C will be received by the reperforator-distributor 10. The relays of the counting circuit will operate in response to the disconnect signal included in the routing information and, upon the reception of the fifth character of the disconnect signal, "figure shift," relay GX will be energized. The directing character combination transmitted by the routing transmitter of transmitter group C consists of the characters "JJ." Therefore, the next character of the routing information received will be the character "J." Relay J will be energized by the operation of the sensing mechanism 127 and the make contacts J1 of relay J will close holding relay RC energized. At the time relay J is energized, relay JX will also be energized due to the closing of make contacts RA2 of relay RA. A path will be completed from the positive terminal 156 to ground through lead 157, the winding of relay LX, lead 178, position 1 of terminal board 179, tie lead 180 (shown as a dotted line), position 2 of terminal board 179, make contacts J2 of relay J, contact 2 and armature 1 of transfer contacts HX2 of relay HX, contact 2 and armature 1 of transfer contacts KX1 of relay KX, break contacts RA2 of relay RA and lead 139. When the tie leads 174 and 175 in terminal board 164 and tie leads 176 and 177 in terminal board 168 are positioned in the respective boards, the tie lead 180 will be positioned in terminal board 179 to connect positions 1 and 2 of the board 179 together. Relay LX will be energized and a path will be completed from the positive terminal 156 to ground through lead 157, the windings of relays LX and MX, make contacts LX1 of relay LX, break contacts SX1 of relay SX, break contacts UX1 of relay UX, break contacts WX1 of relay WX, break contacts ZX1 of relay ZX, lead 147 and lead 139. The sensing shaft will start to rotate to bring the next character of the routing information, character "J," into the sensing contacts of the sensing mechanism 127. Contacts 134 will close energizing relay RA. When relay RA is energized, break contacts RA2 of relay RA will open disconnecting the ground connection to the mid-point between the windings of relay LX and MX. The ground connection to the mid-point between the windings of relays JX and KX will also be disconnected by the opening of break contacts RA2 of relay RA. Relays KX and MX will be energized. The sensing shaft will complete its rotation and a condition corresponding to the second character "J" of the directing character combination "JJ" will be established in the sensing contacts of sensing mechanism 127. Contacts 134 will open and relay RA will be inactivated. Relay J will once again be energized and make contacts J1 of relay J will close holding relay RC energized.

When relay RA is inactivated, break contacts RA2 of relay RA will close and a path will be completed from the positive terminal 156 to ground through lead 157, the winding of relay RX, make contacts KX2 of relays KX, lead 148, contact 3 and armature 1 of transfer contacts KX1 of relay KX, break contacts RA2 of relay RA and lead 139. Relay RX will be energized and, as will be remembered, the opening of break contacts RX1 of relay RX will disconnect the ground connection to the windings of relays GX and HX, inactivating these relays. A path will also be completed from the positive terminal 156 to ground through the winding of relay TX, lead 181, position 1 of terminal board 182, tie lead 183 (shown as a dotted line), position 2 of terminal board 182, make contacts J3 of relay J, make contacts MX1 of relay MX, lead 148, contact 3 and armature 1 of transfer contacts KX1 of relay KX, break contacts RA2 of relay RA and lead 139. Tie lead 183 will be positioned in the terminal board 182 at the same time tie lead 180 is positioned in terminal board 179. Relay TX will be energized and a path will be completed from the positive terminal 156 to ground through lead 157, the windings of relays TX and UX, contact 2 and armature 1 of transfer contacts TX2 of relay TX, contact 3 and armature 1 of transfer contacts VX1 of relay VX, contact 3 and armature 1 of transfer contacts YX1 of relay YX, break contacts GX2 of relay GX, position 1 and wiper 5 of selector switch 114, lead 150, lead 147 and lead 139. The sensing shaft of the sensing mechanism 127 will start to rotate to bring the next character of the routing information, "letters shift," into the sensing contacts of the mechanism 127. Contacts 134 will close and relay RA will be energized. Break contacts RA2 of relay RA will open disconnecting the ground connection to the winding of relay RX and to the mid-point between the windings of relays TX and UX. Relay RX will be inactivated and relay UX will be energized. When relay UX is energized, break contacts UX1 of relay UX will open disconnecting the ground connection to the windings of relays JX, KX, LX and MX, inactivating these relays. The sensing shaft will, thereafter, complete its rotation and a condition corresponding to the character, "letters shift," will be established in the sensing contacts of sensing mechanism 127. Contacts 134 will open, inactivating relay RA. The sensing mechanism 127 will operate to inactivate relay J. Upon the inactivation of relays J and RA, relay RC will be inactivated. The counting circuit will have completed a full sequence of operation and only relays TX and UX will remain energized.

When relay TX is energized, a path will be completed from ground to the positive terminal 158 through distributing contacts 129, lead 155, make contacts TX3 of relay TX, lead 152, selector switch 105, receiving device 15, selector switch 104 and lead 153. The receiving device 15, however, will continue to be grounded through break contacts UX2 of relay UX and lead 154. When relay UX is energized following the energization of relay TX, the break contacts UX2 will open and the receiving device 15 will be operatively connected to the distributing contacts 129 of distributor 130. The message transmitted by transmitter group C will be received by the reperforator-distributor 10 and retransmitted to the receiving device 15. It is the use of tie leads 180 and 183 which connect the positions of terminal boards 179 and 182, respectively, together. With the tie leads 180 and 183 in place, the sequence of operation of the counting circuit is such that relays TX and UX are energized and receiving device 15 is operatively connected to the distributing contacts 129. With the tie leads 180 and 183 removed, the sequence of operation of the counting circuit is such that relays RX and SX are energized and receiving device 14 is operatively connected to the distributing contacts 129, as previously described.

The operation of the receiving director unit when messages are received including incorrect directing character combinations in the routing information will remain the same. Such messages will be fed to receiving device 14. When the receiving director unit is controlled to distribute messages to the four receiving devices 12, 13, 14 and 15, the messages transmitted by transmitter group A will be fed to receiving device 12, by transmitter group B will be fed to receiving device 13, and by transmitter group C will be fed to receiving device 15. This is true when the selector control 16 is set on positions 1, 2 and 3. On position 2, of course, receiving device 12 will be connected directly to transmission line 8, while on position 3, receiving device 13 will be connected directly to transmission line 8. In any case, the messages transmitted by the respective transmitter groups will be properly terminated in the respective receiving devices.

When only three of the receiving devices were used, namely 12, 13 and 14, and selector control 16 was set on position 4, transmission line 7 was connected directly to receiving device 14 and the messages transmitted by transmitter group C were terminated in that device. When all four of the receiving devices are used, however, the messages transmitted by transmitter group C should be terminated at receiving device 15 to correspond to the operation of the receiving director unit when selector control 16 is set on positions 1, 2 or 3. Transmission line 7 is connected to receiving device 15 by the change in the arrangement of terminal boards 164 and 168. Terminal 116 will be connected to terminal 117 via lead 163, position 2 of terminal board 164, tie lead 174 (shown as a dotted line), position 4 and wiper 5 of selector switch 104, receiving device 15, wiper 5 and position 4 of selector switch 105, position 1 of terminal board 168, tie lead 176 (shown as a dotted line), position 2 of terminal board 168 and lead 170. The messages transmitted over line 7 by transmitter group C will, therefore, be terminated in receiving device 15 when the wiper of the selector control 16 is set at any of the four positions of the control.

As the three transmission lines 7, 8 and 9 will be connected directly to the receiving devices 15, 12 and 13, respectively, there will be no need for receiving device 14. A path will be completed from the positive terminal 158 to ground through lead 153, lead 184, position 4 of terminal board 164, tie lead 175 (shown as a dotted line), position 3 of terminal board 164, lead 166, position 4 and wiper 5 of selector switch 103, receiving device 14, wiper 5 and position 4 of selector switch 102, lead 167, position 3 of terminal board 168, tie lead 177 (shown as a dotted line) and position 4 of terminal board 168. It will be remembered that tie leads 165 and 169 will be removed. A steady potential signal is fed to receiving device 14 maintaining the device in standby condition.

The receiving director unit may be operated to terminate the messages transmitted over transmission lines 7, 8 and 9 in either three or four receiving devices. By changing the arrangement of the terminal boards 164, 168, 179, and 182, either method of operation may be used.

Having described the invention, we claim:

1. A telegraph communication system comprising, in combination, a transmitting and receiving station interconnected by a plurality of transmission lines, said transmitting station including a plurality of transmitting devices, said receiving station including a plurality of receiving devices, a selector control device including a number of operating positions, means for selectively operating said selector control device to assume any one of said operating positions, means for sequentially operating said transmitting devices to transmit messages over a single one of said transmission lines when said selector control device is set to operate at one of said operating positions, means for enabling said transmitting devices to transmit messages over separate transmission lines when said selector control device is set to operate at a second one of said operating positions, and means including a distributor located at said receiving station and operated according to the setting of said selector control device for passing the messages transmitted over said transmission lines to said receiving devices.

2. A telegraph communication system comprising, in combination, a transmitting and receiving station interconnected by a plurality of transmission lines, said transmitting station including a plurality of transmitting devices, said receiving station including a plurality of receiving devices, a selector control device including a number of operating positions, means for selectively operating said selector control device to assume any one of said operating positions, means for sequentially operating said transmitting devices to transmit messages over a single one of said transmission lines when said selector control device is set to operate at one of said operatingg positions, means for operating one of said transmitting devices to solely transmit messages over a second one of said transmission lines when said selector control device is set to be operated at a second one of said operating positions, said other transmitting devices being sequentially operated when said selector control device is set to operate at said second one of said operating positions to transmit messages over a single one of said transmission lines, and means including a distributor located at said receiving station and operated according to the setting of said selector control device for passing the messages transmitted over said transmission lines to said receiving devices.

3. A telegraph communication system comprising, in combination, a transmitting and receiving station interconnected by a plurality of transmission lines, said transmitting station including a plurality of transmitting devices, said receiving station including a plurality of receiving devices, a selector control device at said transmitting station including a number of operating positions, means for selectively operating said selector control device to assume any one of said operating positions, means for sequentially operating said transmitting devices to transmit messages over a single one of said transmission lines when said selector control device is set to operate at one of said operating positions, means for enabling said transmitting devices to transmit messages over separate transmission lines when said selector control device is set to operate at a second one of said operating positions, a second selector control device at said receiving station including a number of operating positions, means for selectively operating said second selector control device to assume any one of said operating positions in accordance with the operation of said first selector control device at said transmitting station, and means including a distributor located at said receiving station and operated in accordance with the operation of said second selector control device to pass the messages received over said transmission lines to said receiving devices.

4. A telegraph communication system comprising, in combination, a transmitting and receiving station interconnected by a plurality of transmission lines, said transmitting station including a plurality of transmitting devices, said receiving station including a plurality of receiving devices, a selector control device at said transmitting station including a number of operating positions, means for selectively operating said selector control device to assume any one of said operating positions, means for sequentially operating said transmitting devices to transmit messages over a single one of said transmission lines when said selector control device is set to operate at one of said operating positions, means for operating one of said transmitting devices to transmit messages over a second one of said transmission lines when said selector control device is set to operate at a second one of said operating positions, said remaining transmitting devices being sequentially operated when said selector control device is set to operate at said second one of said operating positions to transmit messages over a single one of said transmission lines, a second selector control device at said receiving station including a number of operating positions, means for selectively operating said second selector control device to assume any one of said operating positions in accordance with the operation of said first selector control device at said transmitting station, and means including a distributor located at said receiving station operated in accordance with the operation of said second selector control device to pass the messages received over said transmission lines to said receiving devices.

5. A telegraph communication system comprising, in combination, a transmitting and receiving station interconnected by a plurality of transmission lines, said transmitting station including a plurality of transmitting devices, said receiving station including a plurality of receiving devices, a selector control device including a number of operating positions, means for selectively operating said selector control device to assume any one of said operating positions, means for sequentially operating said transmitting devices to transmit messages over a single one of said transmission lines when said selector control device is set to operate at one of said operating positions, means for operating one of said transmitting devices to solely transmit messages over a second one of said transmission lines when said selector control device is set to operate at a second one of said operating positions, said other transmitting devices being sequentially operated when said selector control device is set to operate at said second one of said operating positions to transmit messages over a single one of said transmission lines, means for enabling said transmitting devices to transmit messages over separate transmission lines when said selector control device is set to operate at a third one of said operating positions, and means including a distributor located at said receiving station and operated according to the setting of said selector control device for passing the messages received over said transmission lines to said receiving devices.

6. A telegraph communication system comprising, in combination, a transmitting and receiving station interconnected by a plurality of transmission lines, said transmitting station including a plurality of transmitting devices, said receiving station including a plurality of receiving devices, a selector control device at said transmitting station including a number of operating positions, means for selectively operating said selector control device to assume any one of said operating positions, means for sequentially operating said transmitting devices to transmit messages over a single one of said transmission lines when said selector control device is set to operate at one of said operating positions, means for operating one of said transmitting devices to transmit messages over a second one of said transmission lines when said selector control device is set to operate at a second one of said operating positions, said remaining transmitting devices being sequentially operated when said selector control device is set to operate at said second one of said operating positions to transmit messages over said single one of said transmission lines, means for enabling said transmitting devices to transmit messages over separate transmission lines when said selector control device is set to operate at a third one of said operating positions, a second selector control device at said receiving station including a number of operating positions, means for selectively operating said second selector control device to assume any one of said operating positions in accordance with the operation of said first selector control device at said transmitting station, and means including a distributor located at said receiving station and operated in accordance with the operation of said second selector control device to pass the messages received over said transmission lines to said receiving devices.

7. A telegraph communication system comprising, in combination, a transmitting and receiving station interconnected by a plurality of transmission lines, said transmitting station including a plurality of transmitting devices, said receiving station including a plurality of receiving devices, a selector control device including a number of operating positions, means for selectively operating said selector control device to assume any one of said operating positions, an electromagnetic relay switching circuit arranged to sequentially operate said transmitting devices to transmit messages over a single one of said transmission lines when said selector control device is set to operate at one of said operating positions, said relay switching circuit being arranged to enable said transmitting devices to transmit messages over separate transmission lines when said selector control device is set to be operated at a second one of said operating positions, and means including a distributor located at said receiving station and operated according to the setting of said selector control device for passing the messages received over said transmission lines to said receiving devices.

8. A telegraph communication system comprising, in combination, a transmitting and receiving station interconnected by a plurality of transmission lines, said transmitting station including a plurality of transmitting devices, said receiving station including a plurality of receiving devices, a selector control device including a number of operating positions, means for selectively operating said selector control device to assume any one of said operating positions, an electromagnetic relay switching circuit arranged to sequentially operate said transmitting devices to transmit messages over a single one of said transmission lines when said selector control device is set to operate at one of said operating positions, said relay switching circuit being arranged to operate one of said transmitting devices to transmit messages over a second one of said transmission lines when said selector control device is set to operate at a second one of said operating positions, said remaining transmitting devices being sequentially operated by said switching circuit when said selector control device is set to operate at said second one of said operating positions to transmit messages over said one of said transmission lines, and means including a distributor located at said receiving station and operated according to the setting of said selector control device for passing the messages received over said transmission lines to said receiving devices.

9. A telegraph communication system comprising, in combination, a transmitting and receiving station interconnected by a plurality of transmission lines, said transmitting station including a plurality of transmitting devices, said receiving station including a plurality of receiving devices, a selector control device including a number of operating positions, means for selectively operating said selector control device to assume any one of said operating positions, an electromagnetic relay switching circuit arranged to sequentially operate said transmitting devices to transmit messages over a single one of said transmission lines when said selector control device is set to operate at one of said operating positions, said relay switching circuit being arranged to operate one of said transmitting devices to transmit messages over a second one of said transmission lines when said selector control device is set to operate at a second one of said operating positions, said remaining transmitting devices being sequentially operated by said switching circuit when said selector control device is set to operate at said second one of said operating positions to transmit messages over said single one of said transmission lines, said relay switching circuit being further arranged to enable said transmitting devices to transmit messages over separate transmission lines when said selector control device is set to operate at a third one of said operating positions, and means including a distributor located at said receiving station and operated according to the setting of said selector control device for passing the messages received over said transmission lines to said receiving devices.

10. A telegraph communication system comprising, in combination, a transmitting and receiving station interconnected by a plurality of transmission lines, said transmitting station including a plurality of transmitting devices, said receiving station including a plurality of receiving devices, a selector control device at said transmitting station including a number of operating positions, means for selectively operating said selector control device to assume any one of said operating positions, an electromagnetic relay switching circuit arranged to sequentially operate said transmitting devices to transmit messages over a single one of said transmission lines when said selector control device is set to operate at one of said operating positions, said relay switching circuit being arranged to operate one of said transmitting devices to transmit messages over a second one of said transmission lines when said selector control device is set to operate at a second one of said operating positions, said remaining transmitting devices being sequentially operated by said switching circuit when said selector control device is set to operate at said second one of said operating positions to transmit messages over said single one of said transmission lines, said relay switching circuit being further arranged to enable said transmitting devices to transmit messages over separate transmission lines when said selector control device is set to operate at a third one of said operating positions, a second selector control device at said receiving station including a number of operating positions, means for selectively operating said second selector control device to assume any one of said operating positions in accordance with the operation of said first selector control device at said transmitting station, and means including a distributor located at said receiving station operated in accordance with the operation of said second selector control device to pass the messages received over said transmission lines to said receiving devices.

11. A telegraph communication system comprising, in combination, a transmitting and receiving station interconnected by a plurality of transmission lines, said transmitting station including a plurality of transmitting devices, said receiving station including a plurality of receiving devices, a selector control switch including a wiper and a number of contact positions, said wiper arranged to be selectively moved from one of said contact positions to the next, an electromagnetic relay switching circuit arranged to sequentially operate said transmitting devices to transmit messages over a single one of said transmission lines when said wiper is positioned at one of said contact positions, said relay switching circuit being arranged to operate one of said transmitting devices to transmit messages over a second one of said transmission lines when said wiper is positioned at a second one of said contact positions, said remaining transmitting devices being sequentially operated by said switching circuit when said wiper is positioned at said second one of said contact positions to transmit messages over said single one of said transmission lines, said relay switching circuit being further arranged to enable said transmitting devices to transmit messages over separate transmission lines when said wiper is positioned at a third one of said contact positions, means including a distributor located at said receiving station and operated according to the operation of said selector control switch for passing the messages received over said transmission lines to said receiving devices.

12. A telegraph transmitting station comprising, in combination, a plurality of transmitting devices, a plurality of transmission lines adapted to transmit telegraph multi-element code messages from said transmitting station to a remote telegraph receiving station, a selector control device including a number of operating positions, means for selectively operating said selector control device to assume any one of said operating positions, means for sequentially operating said transmitting devices to transmit messages over a single one of said transmission lines when said selector control device is set to operate at one of said operating positions, means for operating one of said transmitting devices to solely transmit messages over a second one of said transmission lines when said selector control device is set to operate at a second one of said operating positions, said remaining transmitting devices being sequentially operated when said selector control device is set to operate at said second one of said operating positions to transmit messages over a single one of said transmission lines.

13. A telegraph communication system comprising, in combination, a plurality of transmitting devices, a plurality of transmission lines adapted to transmit telegraph multi-element code messages from said transmitting station to a remote telegraph receiving station, a selector control device including a number of operating positions, means for selectively operating said selector control device to assume any one of said operating positions, means for sequentially operating said transmitting devices to transmit messages over a single one of said transmission lines when said selector control device is set to operate at one of said operating positions, means for enabling said transmitting devices to transmit messages over separate transmission lines when said selector control device is set to operate at a second one of said operating positions.

14. A telegraph transmitting station comprising, in combination, a plurality of transmitting devices, a plurality of transmission lines adapted to transmit telegraph multi-element code messages from said transmitting station to a remote telegraph receiving station, a selector control device including a number of operating positions, means for selectively operating said selector control device to assume any one of said operating positions, means for sequentially operating said transmitting devices to transmit messages over a single one of said transmission lines when said selector control device is set to operate at one of said operating positions, means for operating one of said transmitting devices to solely transmit messages over a second one of said transmission lines when said selector control device is set to operate at a second one of said operating positions, said remaining transmitting devices being sequentially operated when said selector control device is set to operate at said second one of said operating positions to transmit messages over said single one of said transmission lines, means for enabling said transmitting devices to transmit messages over separate transmission lines when said selector control device is set to operate at a third one of said operating positions.

15. A telegraph transmitting station comprising, in combination, a plurality of transmitting devices, a plurality of transmission lines adapted to transmit telegraph multi-element code messages from said transmitting station to a remote telegraph receiving station, a selector control device including a number of operating positions, means for selectively operating said selector control device to assume any one of said operating positions, means for sequentially operating said transmitting devices to transmit messages over a single one of said transmission lines on a message by message basis when said selector control device is set to operate at one of said operating positions, means for operating one of said transmitting devices to solely transmit messages over a second one of said transmission lines when said selector control device is set to operate at a second one of said single operating positions, said remaining transmitting devices being sequentially operated when said selector control device is set to operate at said second one of said operating positions to transmit messages over said one of said transmission lines on a message by message basis, means for enabling said transmitting devices to transmit messages over separate transmission lines when said selector control device in set to operate at a third one of said operating positions.

16. A telegraph transmitting station comprising, in combination, a plurality of transmitting devices, a plurality of transmission lines adapted to transmit telegraph multi-element code messages from said transmitting station to a remote telegraph receiving station, a selector control device including a number of operating positions, means for selectively operating said selector control device to assume any one of said operating positions, an electromagnetic relay switching circuit, means for operating said switching circuit when said selector control device is set to operate at one of said operating positions to sequentially operate said transmitting devices to transmit messages over a single one of said transmission lines, means for operating said switching circuit when said selector control device is set to operate at a second one of said operating positions to operate one of said transmitting devices to transmit messages over a second one of said transmission lines, said remaining transmitting devices being sequentially operated by said switching circuit when said selector control device is set to operate at said second one of said operating positions to transmit messages over said single one of said transmission lines.

17. A telegraph transmitting station comprising, in combination, a plurality of transmitting devices, a plurality of transmission lines adapted to transmit telegraph multi-element code messages from said transmitting station to a remote telegraph receiving station, a selector control device including a number of operating positions, means for selectively operating said selector control device to assume any one of said operating positions, an electromagnetic relay switching circuit, means for operating said switching circuit when said selector control device is set to operate at one of said operating positions to sequentially operate said transmitting devices to transmit messages over a single one of said transmission lines, means for operating said switching circuit when said selector control device is set to operate at a second one of said operating positions to enable said transmitting devices to transmit messages over separate transmission lines.

18. A telegraph transmitting station, comprising, in combination, a plurality of transmitting devices, a plurality of transmission lines adapted to transmit telegraph multi-element code messages from said transmitting station to a remote telegraph receiving station, a selector control device including a number of operating positions, means for selectively operating said selector control device to assume any one of said operating positions, an electromagnetic relay switching circuit, means for operating said switching circuit when said selector control device is set to operate at one of said operating positions to sequentially operate said transmitting devices to transmit messages over a single one of said transmission lines, means for operating said switching circuit when said selector control device is set to operate at a second one of said operating positions to operate one of said transmitting devices to transmit messages over a second one of said transmission lines, said remaining transmitting devices being sequentially operated by said switching circuit when said selector control device is set to operate at said second one of said operating positions to transmit messages over said single one of said transmission lines, means for operating said switching circuit when said selector control device is set to operate at a third one of said operating positions to enable said transmitting devices to transmit messages over separte transmission lines.

19. A telegraph transmitting station comprising, in combination, a plurality of transmitting devices, a plurality of transmission lines adapted to transmit telegraph multi-element code messages from said transmitting station to a remote telegraph receiving station, a selector control device including a number of operating positions, means for selectively operating said selector control device to assume any one of said operating positions, an electromagnetic relay switching circuit, means for operating said switching circuit when said selector control device is set to operate at one of said operating positions to sequentially operate said transmitting devices to transmit messages over a single one of said transmission lines on a message by message basis, means for operating said switching circuit when said selector control device is set to operate at a second one of said operating positions to operate one of said transmitting devices to transmit messages over a second one of said transmission lines, said remaining transmitting devices being sequentially operated by said switching circuit when said selector control device is set to operate at said second one of said operating positions to transmit messages over said single one of said transmission lines on a message by message basis, means for operating said switching circuit when said selector control device is set to operate at a third one of said operating positions to enable said transmitting devices to transmit messages over separate transmission lines.

20. A telegraph transmitting station comprising, in combination, a plurality of transmitting devices, a plurality of transmission lines adapted to transmit telegraph multi-element code messages from said transmitting station to a remote telegraph receiving station, a selector control switch including a wiper and a number of contact positions, said wiper arranged to be selectively moved from one of said contact positions to the next, an electromagnetic relay switching circuit, means for operating said switching circuit when said wiper is positioned at one of said contact positions to sequentially operate said transmitting devices to transmit messages over a single one of said transmission lines, means for operating said switching circuit when said wiper is positioned at a second one of said contact positions to operate one of said transmitting devices to transmit messages over a second one of said transmission lines, said remaining transmitting devices being sequentially operated by said switching circuit when said selector control switch is set to operate at said second one of said contact positions to transmit messages over said single one of said transmission lines, means for operating said switching circuit when said wiper is positioned at a third one of said contact positions to enable said transmitting devices to transmit messages over separate transmission lines.

21. A telegraph transmitting station comprising, in combination, a first, second and third transmitting device, a plurality of transmission lines adapted to transmit messages from said transmitting station to a remote telegraph receiving station, a first electromagnetic relay switching circuit operatively connected to said first transmitting device, a second electromagnetic relay switching circuit operatively connected to said second transmitting device, a third electromagnetic relay switching circuit operatively connected to said third transmitting device, a selector control device including a number of operating positions, means for selectively operating said selector control device to assume any one of said operating positions, means for operating said switching circuits when said selector control device is set to operate at one of said operating positions to sequently operate said transmitting devices to transmit messages over a single one of said transmission lines, means for operating said first switching circuit when said selector control device is set to operate at a second one of said operating positions to operate said first transmitting device to transmit messages over a second one of said transmission lines, said other switching circuits being operated when said selector control device is set to operate at said second one of said operating positions to sequentially operate said other transmitting devices to transmit messages over a single one of said transmission lines, means for operating said switching circuits when said selector control device is set to operate at a third one of said operating positions to enable said transmitting devices to transmit messages over separate transmission lines.

22. A telegraph transmitting station comprising, in combination, a first, second and third transmitting device, a plurality of transmission lines adapted to transmit telegraph multi-element code messages from said transmitting station to a remote telegraph receiving station, a selector control switch including a wiper and a number of contact positions, said wiper arranged to be selectively moved from one of said contact positions to the next, a first electromagnetic relay switching circuit operatively connected to said first transmitting device, a second electromagnetic relay switching circuit operatively connected to said second transmitting device, a third electromagnetic relay switching circuit operatively connected to said third transmitting device, means for operating said switching circuits when said wiper is positioned at one of said contact positions to sequentially operate said transmitting devices to transmit messages over a single one of said transmission lines, means for operating said first relay switching circuit when said wiper is positioned at a second one of said contact positions to operate said first transmitting device to transmit messages over a second one of said transmission lines, said other transmitting devices being sequentially operated by said other switching circuits when said wiper is positioned at said second one of said contact positions to transmit messages over said single one of said transmission lines, means for operating said switching circuits when said wiper is positioned at a third one of said contact positions to enable said transmitting devices to transmit messages over separate transmission lines.

23. A telegraph transmitting station comprising, in combination, a first, second and third transmitting device, a plurality of transmission lines adapted to transmit telegraph multi-element code messages from said transmitting station to a remote telegraph receiving station, a selector control switch including a wiper and a number of contact positions, said wiper arranged to be selectively moved from one of said contact positions to the next, a first electromagnetic relay switching circuit operatively connected to said first transmitting device, a second electromagnetic relay switching circuit operatively connected to said second transmitting device, a third electromagnetic relay switching circuit operatively connected to said third transmitting device, means for operating said switching circuits when said wiper is positioned at one of said contact positions to sequentially operate said transmitting devices to transmit messages over a single one of said transmission lines on a message by message basis, means for operating said first relay switching circuit when said wiper is positioned at a second one of said contact positions to operate said first transmitting device to transmit messages over a second one of said transmission lines, said other transmitting devices being sequentially operated by said other switching circuits when said wiper is positioned at said second one of said contact positions to transmit messages over said single one of said transmission lines on a message by message basis, means for operating said switching circuits when said wiper is positioned at a third one of said contact positions to enable said transmitting devices to transmit messages over separate transmission lines.

24. In combination, a plurality of transmitting devices, a plurality of transmission lines adapted to carry multi-element code messages from said transmitting devices to a remote receiving station, a switching circuit for operating said transmitting devices to cause each transmitting device to transmit messages over a separate one of said transmission lines, a control device connected to said switching circuit, and means for operating said control device to cause said switching circuit to operate one of said transmitting devices to transmit messages over a given one of said transmission lines and to sequentially operate said other transmitting devices to transmit messages over a second one of said transmission lines.

25. In combination, a plurality of transmitting devices, a plurality of transmission lines adapted to carry multi-element code messages from said transmitting devices to a remote receiving station, a switching circuit for sequentially operating said transmitting devices to transmit messages over a single one of said transmission lines, a selector control device arranged to be set in a number of operating positions, control means responsive to the setting of said control device in one of said positions for causing said switching circuit to operate one of said transmitting devices to transmit messages over one of said transmission lines and to sequentially operate said other transmitting devices to transmit messages over a second one of said transmission lines, said control means being responsive to the setting of said control device at a second one of said positions for causing said switching circuit to operate said transmitting devices to cause each transmitting device to transmit messages over a separate one of said transmission lines.

References Cited in the file of this patent

UNITED STATES PATENTS 2,766,318 Bacon ---------------- Oct. 9, 1956